(12) United States Patent
Zhang et al.

(10) Patent No.: US 12,309,064 B2
(45) Date of Patent: May 20, 2025

(54) METHOD FOR FORWARDING PACKET IN SRv6 SERVICE FUNCTION CHAIN, SFF, AND SF DEVICE

(71) Applicant: Huawei Technologies Co., Ltd., Shenzhen (CN)

(72) Inventors: Yongkang Zhang, Nanjing (CN); Zhibo Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 18/047,299

(22) Filed: Oct. 18, 2022

(65) Prior Publication Data

US 2023/0078123 A1 Mar. 16, 2023

Related U.S. Application Data

(63) Continuation of application No. PCT/CN2021/094206, filed on May 17, 2021.

(30) Foreign Application Priority Data

May 18, 2020 (CN) .......................... 202010421893.2

(51) Int. Cl.
*H04L 45/74* (2022.01)
*H04L 12/46* (2006.01)
*H04L 45/00* (2022.01)

(52) U.S. Cl.
CPC .......... *H04L 45/74* (2013.01); *H04L 12/4641* (2013.01); *H04L 45/566* (2013.01)

(58) Field of Classification Search
CPC ... H04L 12/4641; H04L 45/306; H04L 45/34; H04L 45/50; H04L 45/566; H04L 45/74; H04L 47/78
See application file for complete search history.

(56) References Cited

U.S. PATENT DOCUMENTS

2019/0140863 A1* 5/2019 Nainar .................... H04L 45/34
2020/0099610 A1 3/2020 Heron et al.
(Continued)

FOREIGN PATENT DOCUMENTS

CN 103004166 A 3/2013
CN 106330714 A 1/2017
(Continued)

OTHER PUBLICATIONS

C. Filsfils et al, IPv6 Segment Routing Header (SRH); draft-ietf-6man-segment-routing-header-16, Network Working Group, Feb. 4, 2019, 29 pages.
(Continued)

*Primary Examiner* — Mansour Oveissi
(74) *Attorney, Agent, or Firm* — Slater Matsil, LLP

(57) ABSTRACT

This application provides a method for forwarding a packet in an SRv6 service function chain, an SFF, and an SF device, and belongs to the field of communication technologies. In this application, an End.PT.SID is used to identify that the SFF forwards an SRv6 packet to the SF device without stripping an SRH. Based on the End.PT.SID, the SFF does not strip the SRH in the SRv6 packet, but sends the SRv6 packet to the SF device. In addition, the SFF includes a control flag in the SRv6 packet, so that the control flag is used to identify a scenario in which an IPv6 extension header needs to be offset. The SF device directly offsets the IPv6 extension header in the SRv6 packet based on the control flag, to skip the SRH for service processing.

20 Claims, 19 Drawing Sheets

(56) References Cited

U.S. PATENT DOCUMENTS

| | | | |
|---|---|---|---|
| 2020/0145255 A1 | | 5/2020 | Pignataro et al. |
| 2021/0152470 A1* | | 5/2021 | Filsfils .................... H04L 43/10 |
| 2023/0140531 A1* | | 5/2023 | Peng ....................... H04L 45/74 |
| | | | 709/238 |

FOREIGN PATENT DOCUMENTS

| | | |
|---|---|---|
| CN | 108156077 A | 6/2018 |
| CN | 109688057 A | 4/2019 |
| CN | 110557329 A | 12/2019 |
| WO | 2018166325 A1 | 9/2018 |
| WO | 2019005949 A1 | 1/2019 |
| WO | 2020048493 A1 | 3/2020 |
| WO | 2020182085 A1 | 9/2020 |
| WO | 2021047317 A1 | 3/2021 |
| WO | 2021089004 A1 | 5/2021 |

OTHER PUBLICATIONS

F. Clad, Ed. et al, Service Programming with Segment Routing; draft-ietf-spring-sr-service-programming-02, Mar. 9, 2020, 77 pages.

Filsfils C et al: "SRv6 Network Programming;draft-ietf-spring-srv6-network-programming-15.txt",SRv6 Network Programming; DRAFT-IETF-SPRING-SRV6-NETWORK-PROGRAMMING-15.TXT; Internet-Draft: Spring, Internet Engineering Task Force, IETF;Standardworkingdraft, Internet Society (ISOC) 4, Rue Desfal No. 15, Mar. 27, 2020 (Mar. 27, 2020), pp. 1-39, XP015138897,Retrieved from the Internet:URL:https://tools.ietf.org/html/draft-ietf-spring-srv6-network-programming-15[retrieved on Mar. 27, 2020].

C. Filsfils, Ed., "Segment Routing Architecture", RFC8402, Jul. 2018, 32 pages.

C. Filsfils, Ed. et al., IPv6 Segment Routing Header (SRH), RFC 8754, Mar. 2020, 27 pages.

Clad F et al: "Segment Routing for Service Chaining;draft-xu-clad-spring-sr-service-chaining-OO.txt",Segment Routing for Service Chaining; DRAFT-XU-CLAD-SPRING-SR-SERVICE-CHAINING-OO. TXT; Internet-Draft: Spring,Internet Engineering Task Force, IETF;Standardworkingdraft, Internet Society (ISOC) 4, Rue Desfalaises CH-1205 Geneva, Switzerland, Dec. 22, 2017, pp. 1-35, XP015124914, [retrieved on Dec. 22, 2017].

C. Filsfils et al, Segment Routing Policy Architecture, draft-ietf-spring-segment-routing-policy-06.txt, Spring Working Group Internet-Draft, Dec. 14, 2019, 68 pages.

Filsfils, C. et al., SRv6 Network Programming; draft-ietf-spring-srv6-network-programming-00, Apr. 24, 2019, 83 pages.

Peng Z Li Huawei Technologies C Xie C Li China Telecom S:"SRv6 Compatibility with Legacy Devices;draft-peng-spring-srv6-compatibility-01.txt",SRV6 Compatibility With Legacy Devices; DRAFT-PENG-SPRING-SRV6-COMPATIBILITY-01.TXT; Internet-Draft: Springworking Group, Internet Engineering Task Force, IETF;Standardworkingdraft, Internet Society No. 1, Jul. 8, 2019 (Jul. 8, 2019), pp. 1-10, XP015134189,Retrieved from the Internet:URL:https://tools.ietf.org/html/draft-peng-spring-srv6-compatibility-01.

C. Filsfils, Ed. et al, SRv6 Network Programming, draft-ietf-spring-srv6-network-programming-08, Spring Internet-Draft, Jan. 10, 2020, 38 pages.

J. Halpern et al, Service Function Chaining (SFC) Architecture. RFC7665, Oct. 2015, 32 pages.

P. Quinn et al, Network Service Header (NSH). RFC8300, Jan. 2018, 40 pages.

F. Clad, Ed. et al, Service Programming with Segment Routing; draft-ietf-spring-sr-service-programming-01, Nov. 4, 2019, 63 pages.

C. Filsfils, Ed. et al, IPV6 Segment Routing Header (SRH), draft-ietf-6man-segment-routing-header-26, Network Working Group, Internet-Draft, Oct. 22, 2019, 32 pages.

S. Deering et al., "Internet Protocol, Version 6 (IPv6) Specification",Internet Engineering Task Force (IETF),Request for Comments: 8200 (rfc8200),ISSN: 2070-1721, Jul. 2017, 42 pages.

B. Fenner, RFC4727 Experimental Values In IPV4, IPV6, ICMPv4, ICMPv6, UDP, and TCP Headers, Nov. 2006, 11 pages.

F. Clad et al, Service Programming with Segment Routing; draft-xuclad-spring-sr-service-programming-00, Spring, Jul. 2, 2018, 30 pages.

* cited by examiner

R1—R2—R3————R4(Proxy)
   |                    |
   +---R5---------+

METHOD FOR FORWARDING PACKET IN SRv6 SERVICE FUNCTION CHAIN, SFF, AND SF DEVICE

CROSS-REFERENCE TO RELATED APPLICATIONS

This application is a continuation of International Application No. PCT/CN2021/094206, filed on May 17, 2021, which claims priority to Chinese Patent Application No. 202010421893.2, filed on May 18, 2020. The disclosures of the aforementioned applications are hereby incorporated by reference in their entireties.

TECHNICAL FIELD

This application relates to the field of communication technologies, and especially, to a method for forwarding a packet in an SRv6 service function chain, an SFF, and an SF device.

BACKGROUND

Segment routing (SR) is a technology used for forwarding packets based on source routing. Segment routing over internet protocol version 6 (IPv6) (SRv6 for short) is a technology that combines the SR technology and the IPv6 protocol. Specifically, in a common IPv6 packet, a destination address (DA) of the IPv6 packet is fixed. However, in the SRv6 field, a DA of an IPv6 packet is an SRv6 segment ID (SID), the DA of the IPv6 packet identifies a next hop node, and an SRv6 node continuously updates the DA to complete hop-by-hop forwarding.

In the SRv6 technology, to implement SR based on an IPv6 forwarding plane, an IPv6 extension header, referred to as a segment routing header (SRH), is added. An SRH is essentially an IPv6 extension header of a routing type. The SRH includes a SID list (also referred to as segment list). The SID list contains one or more SIDs arranged in sequence. An SRv6 packet refers to an IPv6 packet carrying an SRH.

A service function chain (SFC) is an ordered service function set that allows traffic to pass through a plurality of service function (SF) devices in a specified order, and the plurality of SF devices to sequentially process a packet, to complete a service processing process.

An SFC is gradually evolving towards an SRv6 SFC. However, many SF devices still do not support SRv6 at present. In other words, the SF device is an SRv6-unaware device, and the SF device cannot identify the SRH in the SRv6 packet. In view of this, the SF device is usually connected to one or more service function forwarders (SFF). In a process of forwarding a packet in an SRv6 service function chain, the SFF implements an SR proxy function to forward the SRv6 packet to the SF device in a manner of stripping an SRH, to ensure that the SRv6 packet can be normally processed by the SF device.

A type of the SR proxy can be dynamic proxy, static proxy, shared-memory proxy, masquerading proxy, or the like. A processing process of a dynamic proxy is used as an example. A process in which an SFF forwards a packet is as follows: The SFF receives an SRv6 packet and queries a local SID table based on a destination address of the SRv6 packet; when the destination address is an endpoint dynamic proxy SID (End.AD.SID, where End indicates endpoint, D indicates dynamic, and SID indicates segment ID) in the local SID table, the SFF performs a dynamic proxy operation corresponding to the End.AD.SID, to be specific, the SFF strips an SRH from the SRv6 packet to obtain a packet that does not include the SRH, sends the packet that does not include the SRH to an SF device, and caches the SRH; the SF device receives the packet that does not include the SRH, processes the packet, and returns the processed packet to the SFF; and after receiving the packet that does not include the SRH and that is returned by the SF device, the SFF obtains the SRH from the cache, restores the SRH for the processed packet to restore the packet to an SRv6 packet, and then forwards the SRv6 packet.

When the foregoing method is used, in a forwarding process, the SFF needs to strip the SRH in the SRv6 packet, and restore the SRH for the packet returned by the SF device. Consequently, SFF implementation is complex, and SFF overheads are high.

SUMMARY

Embodiments of this application provide a method for forwarding a packet in an SRv6 service function chain, an SFF, and an SF device, to simplify SFF implementation. The technical solution is as follows.

According to a first aspect, a method for forwarding a packet in an SRv6 service function chain is provided. In the method, a service function forwarder SFF receives a first segment routing over internet protocol version 6 SRv6 packet, where a destination address of the first SRv6 packet includes an endpoint penetrate segment ID End.PT.SID, and the End.PT.SID is used to indicate the SFF to forward the first SRv6 packet to a service function SF device without stripping a segment routing header SRH; the SFF generates a second SRv6 packet based on the End.PT.SID and the first SRv6 packet, where the second SRv6 packet includes a control flag, the control flag is used to indicate the SF device to offset an internet protocol version 6 IPv6 extension header that follows the control flag in the second SRv6 packet, and the IPv6 extension header in the second SRv6 packet includes an SRH; and the SFF sends the second SRv6 packet to the SF device.

The foregoing provides a method for implementing the SRv6 service function chain. The End.PT.SID is provided and used to identify that the SFF forwards the SRv6 packet to the SF device without stripping the SRH. Based on the End.PT.SID, the SFF does not strip the SRH in the SRv6 packet, but sends the SRv6 packet to the SF device. In addition, the SFF includes a control flag in the SRv6 packet, so that the control flag is used to identify a scenario in which an IPv6 extension header needs to be offset. After receiving the SRv6 packet, the SF device directly offsets the IPv6 extension header in the SRv6 packet based on the control flag, to skip the SRH. By using this method, the SFF does not need to support an SRv6 SFC proxy function. To be specific, in a packet forwarding process, the SFF does not need to perform steps of stripping the SRH and restoring the SRH, thereby greatly simplifying implementation of the SFF on a forwarding plane. In addition, the SFF does not need to generate or maintain a cache, and a stateless forwarding plane can be implemented. For the SF device, the SF device may implement the SRv6 SFC function without implementing SRv6 and End.AN SID functions.

Optionally, the control flag is further used to indicate the SF device to return the IPv6 extension header in a process of returning a packet to the SFF, and after that the SFF sends the second SRv6 packet to the SF device, the method further includes the following.

The SFF receives a third SRv6 packet from the SF device, where the third SRv6 packet includes the IPv6 extension header, and the third SRv6 packet and the second SRv6 packet have a same SRH; and the SFF performs forwarding processing on the third SRv6 packet based on the SRH in the third SRv6 packet.

Optionally, the third SRv6 packet is a packet that is obtained by the SF device by performing service processing.

Optionally, the second SRv6 packet includes a hop-by-hop option header, and the hop-by-hop option header includes the control flag.

Because the hop-by-hop option header is always used as the first IPv6 extension header in an IPv6 packet, the hop-by-hop option header is easily parsed by the SF device, so that the SF device can identify the control flag and target information based on the hop-by-hop option header, and perform related processing.

Optionally, the hop-by-hop option header includes a type-length-value TLV, and the TLV is used to carry the control flag.

Optionally, the control flag is used to indicate the SF device to offset the SRH in the second SRv6 packet; or the control flag is used to indicate the SF device to offset the SRH in the second SRv6 packet and another IPv6 extension header other than the SRH, where the another IPv6 extension header follows the control flag in the second SRv6 packet.

Optionally, the second SRv6 packet further includes target information, the target information is information that needs to be used when the SF device performs service processing, and the target information is obtained in the following manner: The SFF obtains the target information from the SRH in the first SRv6 packet.

For a purpose of service processing, the SF device may need to be aware of some information encapsulated in the SRH. However, the SF device usually cannot identify the SRH. As a result, service information in the SRH cannot be obtained, and therefore the SF device cannot perform service processing based on the service information in the SRH. Instead, the SFF parses the SRH, and the SFF transfers the service information included in the SRH to the SF device, so that the SF device can obtain the service information included in the SRH. In addition, the SF device does not need to parse the SRH. This optional manner meets a requirement that the SF device performs service processing based on the service information in the SRH, and an SRv6-unaware SF device can perform service processing based on the service information in the SRH in this manner, thereby extending an application range.

Optionally, the SFF obtains the service information from the SRH in the first SRv6 packet, and queries mapping relationship information based on the service information to obtain the target information, where the mapping relationship information stores a correspondence between the service information and the target information.

The SFF maps the service information in the SRH to target information identifiable by the SF device, and includes the target information in the second SRv6 packet sent to the SF device, so that the service information is transferred to the SF device in a form understood by the SF device, and the SF device may perform service processing based on the target information. This avoids a case in which the SF device does not identify the service information in the SRH and cannot perform service processing based on the service information, and meets a requirement that the SF device performs service processing based on the service information in the SRH. In addition, manner 2 may be applied to the SRv6-unaware SF device, thereby extending an application range.

Optionally, the target information includes at least one of service function chain SFC metadata and a virtual private network ID VPN ID. Alternatively, the service information includes at least one of SFC metadata and a VPN ID.

Optionally, the target information and the control information are located in a same TLV in the second SRv6 packet.

According to a second aspect, a method for processing a packet in an SRv6 service function chain is provided. In the method, an SF device receives a second segment routing over internet protocol version 6 SRv6 packet from a service function forwarder SFF, where the second SRv6 packet includes a control flag, the control flag is used to indicate the SF device to offset an internet protocol version 6 IPv6 extension header that follows the control flag in the second SRv6 packet, and the IPv6 extension header in the second SRv6 packet includes a segment routing header SRH; and the SF device offsets the IPv6 extension header in the second SRv6 packet based on the control flag.

Optionally, the control flag is further used to indicate the SF device to return the IPv6 extension header in a process of returning a packet to the SFF, and the method further includes: The SF device sends a third SRv6 packet to the SFF based on the control flag, where the third SRv6 packet includes the IPv6 extension header, and the third SRv6 packet and the second SRv6 packet have a same SRH.

Optionally, the third SRv6 packet is a packet that is obtained by the SF device by performing service processing.

Optionally, the second SRv6 packet includes a hop-by-hop option header, and the hop-by-hop option header includes the control flag.

Optionally, the hop-by-hop option header includes a type-length-value TLV, and the TLV is used to carry the control flag.

Optionally, the control flag is used to indicate the SF device to offset the SRH in the second SRv6 packet; or the control flag is used to indicate the SF device to offset the SRH in the second SRv6 packet and another IPv6 extension header other than the SRH, where the another IPv6 extension header follows the control flag in the second SRv6 packet.

Optionally, the second SRv6 packet further includes target information, the target information is information that needs to be used when the SF device performs the service processing, and the performing service processing includes: performing service processing based on the target information.

Optionally, the target information includes at least one of service function chain SFC metadata and a virtual private network ID VPN ID.

Optionally, the target information and the control information are located in a same TLV in the second SRv6 packet.

According to a third aspect, a method for forwarding a packet in an SRv6 service function chain is provided. The method includes: A service function forwarder SFF receives a first segment routing over internet protocol version 6 SRv6 packet, where a destination address of the first SRv6 packet includes an endpoint penetrate segment ID End.PT.SID, and the End.PT.SID is used to indicate the SFF to forward the first SRv6 packet to a service function SF device without stripping a segment routing header SRH; the SFF generates a second SRv6 packet based on the End.PT.SID and the first SRv6 packet, where an internet protocol version 6 IPv6 extension header in the second SRv6 packet includes an SRH; and the SFF sends the second SRv6 packet to a first interface of the SF device, where the SF device is configured to offset an IPv6 extension header in a packet received through the first interface.

The foregoing provides a method for implementing the SRv6 service function chain. The End.PT.SID is provided and used to identify that the SFF forwards the SRv6 packet to the SF device without stripping the SRH. Based on the End.PT.SID, the SFF does not strip the SRH in the SRv6 packet, but sends the SRv6 packet to the SF device. In addition, an inbound interface specified on the SF device is used to identify a scenario in which an IPv6 extension header needs to be offset. The SFF sends the SRv6 packet to the inbound interface specified on the SF device. After receiving the SRv6 packet through the specified inbound interface, the SF device directly offsets the IPv6 extension header in the SRv6 packet, to skip the SRH for service processing. By using this method, the SFF does not need to support an SRv6 SFC proxy function. To be specific, in a packet forwarding process, the SFF does not need to perform steps of stripping the SRH and restoring the SRH, thereby greatly simplifying implementation of the SFF on a forwarding plane. In addition, the SFF does not need to generate or maintain a cache, and a stateless forwarding plane can be implemented. For the SF device, the SF device may implement the SRv6 SFC function without implementing SRv6 and End.AN SID functions.

According to a fourth aspect, a method for processing a packet in an SRv6 service function chain is provided. The method includes: A service function SF device receives a second segment routing over internet protocol version 6 SRv6 packet from a service function forwarder SFF through a first interface, where the SF device is configured to offset an internet protocol version 6 IPv6 extension header in a packet received through the first interface, and the IPv6 extension header in the second SRv6 packet includes a segment routing header SRH; and the SF device offsets the IPv6 extension header in the second SRv6 packet.

According to a fifth aspect, a method for forwarding a packet in an SRv6 service function chain is provided. The method includes: A service function forwarder SFF receives a first segment routing over internet protocol version 6 SRv6 packet, where a destination address of the first SRv6 packet includes an endpoint penetrate segment ID End.PT.SID, and the End.PT.SID is used to indicate the SFF to forward the first SRv6 packet to a service function SF device without stripping a segment routing header SRH; the SFF generates a second SRv6 packet based on the End.PT.SID and the first SRv6 packet, where an internet protocol version 6 IPv6 extension header in the second SRv6 packet includes an SRH; and the SFF sends the second SRv6 packet to the SF device, where the SF device is configured to offset an IPv6 extension header in a packet that meets a matching condition in an access control list ACL.

The foregoing provides a method for implementing the SRv6 service function chain. The End.PT.SID is provided and used to identify that the SFF forwards the SRv6 packet to the SF device without stripping the SRH. Based on the End.PT.SID, the SFF does not strip the SRH in the SRv6 packet, but sends the SRv6 packet to the SF device. In addition, an ACL configured on the SF device is used to identify a scenario in which an IPv6 extension header needs to be offset. After the SF device receives the SRv6 packet, if the SF device determines that the SRv6 packet meets the matching condition in the ACL, the SF device directly offsets the IPv6 extension header in the SRv6 packet, to skip the SRH. By using this method, the SFF does not need to support an SRv6 SFC proxy function. To be specific, in a packet forwarding process, the SFF does not need to perform steps of stripping the SRH and restoring the SRH, thereby greatly simplifying implementation of the SFF on a forwarding plane. In addition, the SFF does not need to generate or maintain a cache, and a stateless forwarding plane can be implemented. For the SF device, the SF device may implement the SRv6 SFC function without implementing SRv6 and End.AN SID functions.

According to a sixth aspect, a method for processing a packet in an SRv6 service function chain is provided. The method includes: A service function SF device receives a second segment routing over internet protocol version 6 SRv6 packet from a service function forwarder SFF, where the SF device is configured to offset an internet protocol version 6 IPv6 extension header in a packet that meets a matching condition in an access control list ACL, and the IPv6 extension header in the second SRv6 packet includes a segment routing header SRH; the SF device determines that the second SRv6 packet meets the matching condition in the ACL; and the SF device offsets the IPv6 extension header in the second SRv6 packet.

According to a seventh aspect, an SFF is provided. The SFF has a function of forwarding a packet in an SRv6 service function chain in the first aspect or any optional manner of the first aspect. The SFF includes at least one module, and the at least one module is configured to implement the method for forwarding a packet in an SRv6 service function chain provided in the first aspect or any optional manner of the first aspect. For specific details of the SFF provided in the seventh aspect, refer to the first aspect or any optional manner of the first aspect. Details are not described herein again.

According to an eighth aspect, an SF device is provided. The SF device has a function of forwarding a packet in an SRv6 service function chain in the second aspect or any optional manner of the second aspect. The SF device includes at least one module, and the at least one module is configured to implement the method for forwarding a packet in an SRv6 service function chain provided in the second aspect or any optional manner of the second aspect. For specific details of the SF device provided in the eighth aspect, refer to the second aspect or any optional manner of the second aspect. Details are not described herein again.

According to a ninth aspect, an SFF is provided. The SFF can implement forwarding of a packet in an SRv6 service function chain in the third aspect or any optional manner of the third aspect. The SFF includes at least one module, and the at least one module is configured to implement the method for forwarding a packet in an SRv6 service function chain provided in the third aspect or any optional manner of the third aspect. For specific details of the SFF provided in the ninth aspect, refer to the third aspect or any optional manner of the third aspect. Details are not described herein again.

According to a tenth aspect, an SF device is provided. The SF device can implement forwarding of a packet in an SRv6 service function chain in the fourth aspect or any optional manner of the fourth aspect. The SF device includes at least one module, and the at least one module is configured to implement the method for forwarding a packet in an SRv6 service function chain provided in the fourth aspect or any optional manner of the fourth aspect. For specific details of the SF device provided in the tenth aspect, refer to the fourth aspect or any optional manner of the fourth aspect. Details are not described herein again.

According to an eleventh aspect, an SFF is provided. The SFF can implement forwarding of a packet in an SRv6 service function chain in the fifth aspect or any optional manner of the fifth aspect. The SFF includes at least one module, and the at least one module is configured to implement the method for forwarding a packet in an SRv6 service function chain provided in the fifth aspect or any optional manner of the fifth aspect. For specific details of the SFF provided in the eleventh aspect, refer to the fifth aspect or any optional manner of the fifth aspect. Details are not described herein again.

According to a twelfth aspect, an SF device is provided. The SF device can implement forwarding of a packet in an SRv6 service function chain in the sixth aspect or any optional manner of the sixth aspect. The SF device includes at least one module, and the at least one module is configured to implement the method for forwarding a packet in an SRv6 service function chain provided in the sixth aspect or any optional manner of the sixth aspect. For specific details of the SF device provided in the twelfth aspect, refer to the sixth aspect or any optional manner of the sixth aspect. Details are not described herein again.

According to a thirteenth aspect, an SFF is provided. The SFF includes a processor and a physical interface. The processor is configured to execute an instruction, so that the SFF performs the method for forwarding a packet in an SRv6 service function chain provided in the first aspect or any optional manner of the first aspect. The physical interface is configured to receive a packet or send a packet. For specific details of the SFF provided in the thirteenth aspect, refer to the first aspect or any optional manner of the first aspect. Details are not described herein again.

According to a fourteenth aspect, an SF device is provided. The SF device includes a processor and a physical interface. The processor is configured to execute an instruction, so that the SF device performs the method for forwarding a packet in an SRv6 service function chain provided in the second aspect or any optional manner of the second aspect. The physical interface is configured to receive a packet. For specific details of the SF device provided in the fourteenth aspect, refer to the second aspect or any optional manner of the second aspect. Details are not described herein again.

According to a fifteenth aspect, an SFF is provided. The SFF includes a processor and a physical interface. The processor is configured to execute an instruction, so that the SFF performs the method for forwarding a packet in an SRv6 service function chain provided in the third aspect or any optional manner of the third aspect. The physical interface is configured to receive a packet or send a packet. For specific details of the SFF provided in the fifteenth aspect, refer to the third aspect or any optional manner of the third aspect. Details are not described herein again.

According to a sixteenth aspect, an SF device is provided. The SF device includes a processor and a physical interface. The processor is configured to execute an instruction, so that the SF device performs the method for forwarding a packet in an SRv6 service function chain provided in the fourth aspect or any optional manner of the fourth aspect. The physical interface is configured to receive a packet. For specific details of the SF device provided in the sixteenth aspect, refer to the fourth aspect or any optional manner of the fourth aspect. Details are not described herein again.

According to a seventeenth aspect, an SFF is provided. The SFF includes a processor and a physical interface. The processor is configured to execute an instruction, so that the SFF performs the method for forwarding a packet in an SRv6 service function chain provided in the fifth aspect or any optional manner of the fifth aspect. The physical interface is configured to receive a packet or send a packet. For specific details of the SFF provided in the seventeenth aspect, refer to the fifth aspect or any optional manner of the fifth aspect. Details are not described herein again.

According to an eighteenth aspect, an SF device is provided. The SF device includes a processor and a physical interface. The processor is configured to execute an instruction, so that the SF device performs the method for forwarding a packet in an SRv6 service function chain provided in the sixth aspect or any optional manner of the sixth aspect. The physical interface is configured to receive a packet. For specific details of the SF device provided in the eighteenth aspect, refer to the sixth aspect or any optional manner of the sixth aspect. Details are not described herein again.

According to a nineteenth aspect, a computer-readable storage medium is provided. The storage medium stores at least one instruction, and the instruction is read by a processor, to enable an SFF to perform the method for forwarding a packet in an SRv6 service function chain provided in the first aspect or any optional manner of the first aspect.

According to a twentieth aspect, a computer-readable storage medium is provided. The storage medium stores at least one instruction, and the instruction is read by a processor, to enable an SF device to perform the method for forwarding a packet in an SRv6 service function chain provided in the second aspect or any optional manner of the second aspect.

According to a twenty-first aspect, a computer-readable storage medium is provided. The storage medium stores at least one instruction, and the instruction is read by a processor, to enable an SFF to perform the method for forwarding a packet in an SRv6 service function chain provided in the third aspect or any optional manner of the third aspect.

According to a twenty-second aspect, a computer-readable storage medium is provided. The storage medium stores at least one instruction, and the instruction is read by a processor, to enable an SF device to perform the method for forwarding a packet in an SRv6 service function chain provided in the fourth aspect or any optional manner of the fourth aspect.

According to a twenty-third aspect, a computer-readable storage medium is provided. The storage medium stores at least one instruction, and the instruction is read by a processor, to enable an SFF to perform the method for forwarding a packet in an SRv6 service function chain provided in the fifth aspect or any optional manner of the fifth aspect.

According to a twenty-fourth aspect, a computer-readable storage medium is provided. The storage medium stores at least one instruction, and the instruction is read by a processor, to enable an SF device to perform the method for forwarding a packet in an SRv6 service function chain provided in the sixth aspect or any optional manner of the sixth aspect.

According to a twenty-fifth aspect, a computer program product is provided. When the computer program product is run on an SFF, the SFF performs the method for forwarding a packet in an SRv6 service function chain provided in the first aspect or any optional manner of the first aspect, the third aspect or any optional manner of the third aspect, or the fifth aspect or any optional manner of the fifth aspect.

According to a twenty-sixth aspect, a computer program product is provided. When the computer program product is run on an SF device, the SF device performs the method for forwarding a packet in an SRv6 service function chain provided in the second aspect or any optional manner of the second aspect, the fourth aspect or any optional manner of the fourth aspect, or the fifth aspect or any optional manner of the fifth aspect.

According to a twenty-seventh aspect, a chip is provided. When the chip is run on an SFF, the SFF performs the method for forwarding a packet in an SRv6 service function chain provided in the first aspect or any optional manner of the first aspect, the third aspect or any optional manner of the third aspect, or the fifth aspect or any optional manner of the fifth aspect.

According to a twenty-eighth aspect, a chip is provided. When the chip is run on an SF device, the SF device performs the method for forwarding a packet in an SRv6 service function chain provided in the second aspect or any optional manner of the second aspect, the fourth aspect or any optional manner of the fourth aspect, or the fifth aspect or any optional manner of the fifth aspect.

According to a twenty-ninth aspect, a network system is provided. The network system includes an SFF and an SF device. The SFF is configured to perform the method according to the first aspect or any optional manner of the first aspect, and the SF device is configured to perform the method according to the second aspect or any optional manner of the second aspect.

According to a thirtieth aspect, a network system is provided. The network system includes an SFF and an SF device. The SFF is configured to perform the method according to the third aspect or any optional manner of the third aspect, and the SF device is configured to perform the method according to the fourth aspect or any optional manner of the fourth aspect.

According to a thirty-first aspect, a network system is provided. The network system includes an SFF and an SF device. The SFF is configured to perform the method according to the fifth aspect or any optional manner of the fifth aspect, and the SF device is configured to perform the method according to the sixth aspect or any optional manner of the sixth aspect.

DETAILED DESCRIPTION OF ILLUSTRATIVE EMBODIMENTS

Figure 1:
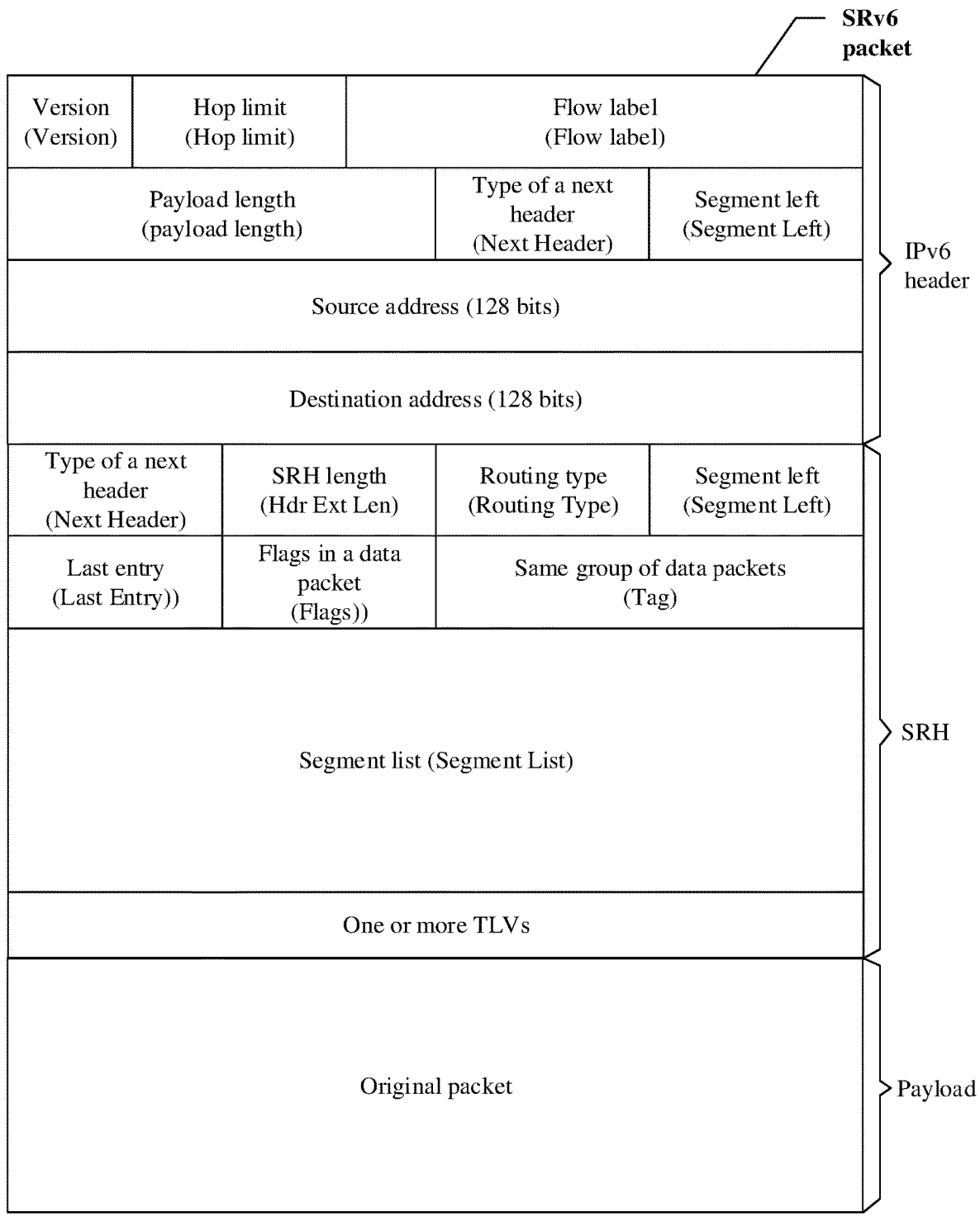
FIG. 1 is a schematic diagram of an SRv6 packet according to an embodiment of this application.

To make objectives, technical solutions, and advantages of this application clearer, the following further describes implementations of this application in detail with reference to the accompanying drawings.

A method provided in this embodiment of this application for forwarding a packet in a segment routing over internet protocol version 6 (SRv6) service function chain can be applied to a service function chain (SFC for short, also referred to as a service chain) scenario in a segment routing (SR) field. The following briefly describes an SR technology, an SFC technology, and an SR SFC technology separately.

SR is a tunneling technology based on a source routing forwarding mode. In the SR technology, two data planes are included: multi-protocol label switching (MPLS) and internet protocol version 6 (IPv6). The two data planes are referred to as SR MPLS and SRv6 respectively. SRv6 usually uses a segment routing header (SRH) to carry a SID list (also referred to as segment list). The SID list specifies a forwarding path of an IPv6 packet. An SRH is an IPv6 routing header. For example, a value of a routing type of the SRH is 4.

A design idea of SR includes: maintaining a per-flow state on a head end node of a service flow, without the need to maintain the per-flow state on a transit node and a tail end node. The head end node of the service flow is a head end node of an SR tunnel. An SR policy is a function of maintaining the per-flow state.

A segment (also referred to as segmenting) or a segment ID (SID) is a core element of SR. A definition of a segment includes: A segment represents any topology, instruction, or service.

An SR tunnel is a tunnel formed by encapsulating a segment list into a packet header on the head end node. An SR tunnel may be used for a traffic engineering (TE) tunnel application, or may be used for operations, administration, and maintenance (OAM) detection, fast reroute (FRR), and the like. The SR tunnel may be established in a distributed manner or in a centralized manner. The distributed manner refers to a manner in which a SID is advertised by using an intermediate system to intermediate system (IS-IS), an open shortest path first (OSPF), or a border gateway protocol (BGP). The centralized manner refers to a manner in which an SDN controller collects and calculates a path by using a border gateway protocol-link state (BGP-IS) or a path computation element communication protocol (PCEP). The tunnel herein generally refers to a set of end-to-end paths between two points, where the two points are respectively a start point of the tunnel and an end point of the tunnel. The start point of the tunnel is a head end node, and the end point of the tunnel is a tail end node. The tunnel includes one path or a plurality of paths.

The SRH uses a loose source routing mode. To be specific, it is not required that every hop on a forwarding path supports and parses the SRH, and it is not required that a SID list in the SRH contains every hop node on the path. An SRv6 tunnel packet may not contain an SRH.

The head end node may specify a SID list of an SR tunnel in two manners. One manner is an explicit candidate path (Explicit candidate path), and the other manner is a dynamic candidate path. In addition, a binding SID (BSID) may be used to steer traffic to an SR policy, thereby shielding topology details of some networks and avoiding insufficiency of hardware chip MSD specifications.

Compared with SR MPLS, SRv6 has common features of SR, and prominently, SRv6 supports network programming. Through network programming, SRv6 has a powerful scalability, and SRv6 can be applied to various application scenarios. For example, SRv6 can be used to implement BGP or SR layer 3 virtual private network (SR L3 VPN), Ethernet virtual private network layer 2 virtual private network (EVPN L2 VPN) or EVPN L3 VPN, SFC, and the like.

The foregoing introduces an overview of the SR technology, and the following describes some technical terms in the SRv6 technology.

A segment list represents an ordered segment list of a packet forwarding path. In SR MPLS, a segment list is a label stack. In SRv6, a segment list is an IPv6 address list, which is carried in an SRH of an IPv6 packet.

A segment represents a packet processing instruction, for example, indicating a device to forward packets to a destination over the shortest path or through a specified interface, or to forward packets to a specified application or service instance.

A SID is an ID of a segment and uniquely identifies a segment. On an SR MPLS forwarding plane, a SID can be mapped to an MPLS label. On an SRv6 forwarding plane, a SID can be mapped to an IPv6 address. The SID can represent a topology, an instruction, or a service in essence.

An active SID is a segment to be processed in a segment list. When receiving a packet, an SR node processes an active segment. In SR MPLS, an active segment is the outermost label of a label stack. In SRv6, an active segment is a destination address of an IPv6 packet carrying an SRH.

In addition, the active segment may be indicated by a value of an SL field. For example, if a segment list includes five SIDs: SID 0, SID 1, SID 2, SID 3, and SID 4, and an SL value is 2, it indicates that two SIDs in the segment list that are not processed are SID 0 and SID 1, a SID in the segment list to be processed currently is SID 2, and two SIDs in the segment list that have been processed are SID 3 and SID 4.

SRv6 is an SR technology applied to an IPv6 network. An SRv6 SID is encoded using an IPv6 address (128 bits) and encapsulated in an SRH. When forwarding a packet, an SRv6-capable node queries a local SID table based on a destination address (DA) in the packet. When the destination address of the packet matches any SID in the local SID table, it is determined that the destination address matches the local SID table, and a corresponding operation is performed based on a topology, an instruction, or a service corresponding to the SID. If the destination address of the packet does not match any SID in the local SID table, an IPv6 routing forwarding table is queried based on the destination address and the packet is forwarded based on a routing forwarding table matching the destination address.

The local SID table is maintained by an SRv6-enabled node. The local SID table contains an SRv6 SID generated by a local node. An SRv6 forwarding table FIB can be generated based on the local SID table. The local SID table has three functions. First, defining a locally generated SID, for example, End.X SID. Second, specifying an instruction that is bound to the SID. Third, storing forwarding information, such as an outbound interface and a next hop, related to the instruction.

An SRv6 packet is an IPv6 packet that includes an IPv6 standard header, an extension header (0 . . . n), and a payload. To implement Segment Routing IPv6 (SRv6) based on the IPv6 forwarding plane, an IPv6 extension header, referred to as an SRH (Segment Routing Header) extension header, is added. This extension header specifies an IPv6 explicit path and stores IPv6 segment list information. A head end node adds an SRH extension header to an IPv6 packet, so that a transit node may forward the packet based on path information included in the SRH extension header. By adding the extension header, SR is smoothly integrated with the original IPv6 forwarding plane.

Refer to FIG. 1. FIG. 1 is a schematic diagram of an SRv6 packet according to an embodiment of this application. The SRv6 packet may include an IPv6 header, an SRH, and a payload. The following describes each part of the SRv6 packet through (1) to (3).

(1) IPv6 Header in the SRv6 Packet

The IPv6 header in the SRv6 packet may include a source address (SA) and a DA. In a common IPv6 packet, an IPv6 DA is fixed. In SRv6, an IPv6 DA identifies a next node of the current packet. In an SR tunnel, an SR node may continuously update the destination address to complete hop-by-hop forwarding. A SID carried in the destination address in the IPv6 header may be referred to as an active SID.

(2) SRH in the SRv6 Packet

Figure 2:
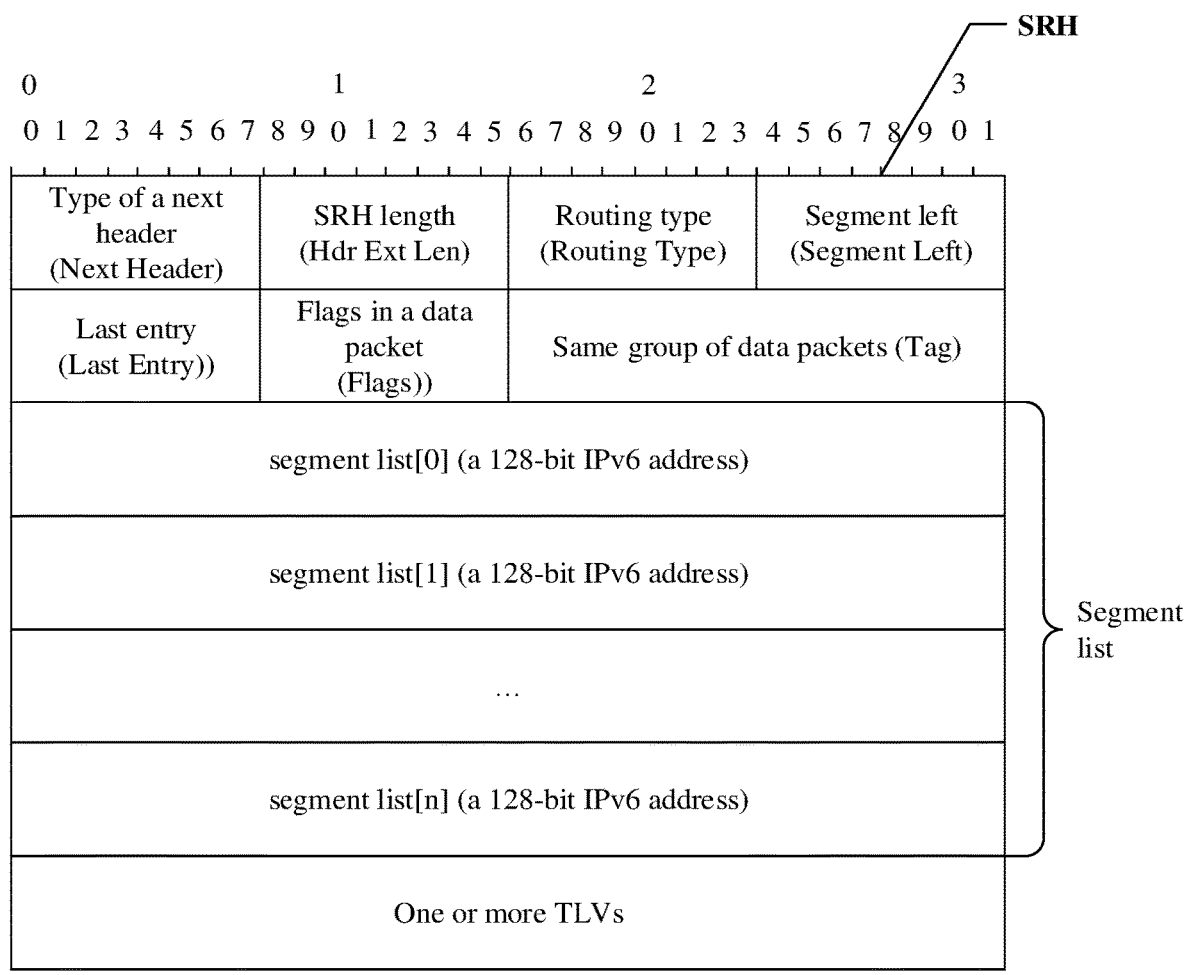
FIG. 2 is a schematic diagram of an SRH according to an embodiment of this application.

The SRH is an IPv6 extension header. The SRH is used to implement SRv6 based on an IPv6 forwarding plane. Refer to FIG. 2. FIG. 2 is a schematic diagram of an SRH according to an embodiment of this application.

The SRH may include the following (2.1) to (2.9).

(2.1) Segment List

A segment list may include one or more SIDs, each of which may be in the format of an IPv6 address, and therefore a segment list may also be understood as an explicit IPv6 address stack. The segment list may be denoted as segment list[n]. A length of segment list[n] is 128×n bits. The segment list may be encoded starting from the last segment of a path. The segment list is in the format of an IPv6 address.

(2.2) Segments Left (SL)

An SL is used to indicate a quantity of transit nodes that should still be accessed before a packet arrives at a destination node. The SL field may also be referred to as a remaining node field. A value of the SL field may indicate an active SID in the segment list. A length of the SL may be 8 bits. For example, if a segment list includes five SIDs: SID 0, SID 1, SID 2, SID 3, and SID 4, and an SL value is 2, it indicates that two SIDs in the segment list that are not processed are SID 0 and SID 1, a SID in the segment list to be processed currently is SID 2, and two SIDs in the segment list that have been processed are SID 3 and SID 4.

With reference to the foregoing (2.1) and (2.2), the SRH may be abstracted into the following format:

SRH (SL=n)
<segment list [0], segment list [1], segment list [2], ..., segment list [n]>:
<segment list [0], segment list [1], segment list [2], ..., segment list [n]> are segment lists in an SRv6 packet, which are similar to MPLS label stack information in SR MPLS and are generated on an ingress node. segment list [0] is the first segment list to be processed on an SRv6 path, segment list [1] is the second segment list, segment list [2] is the third segment list, and segment list [n] is the (n+1)$^{th}$ segment list by analogy.

It should be noted that an SRH in an IPv6 packet may be expressed in reverse order. To be specific, the SRH may be expressed in the format of (segment list [2], segment list [1], segment list [0]).

Figure 3:
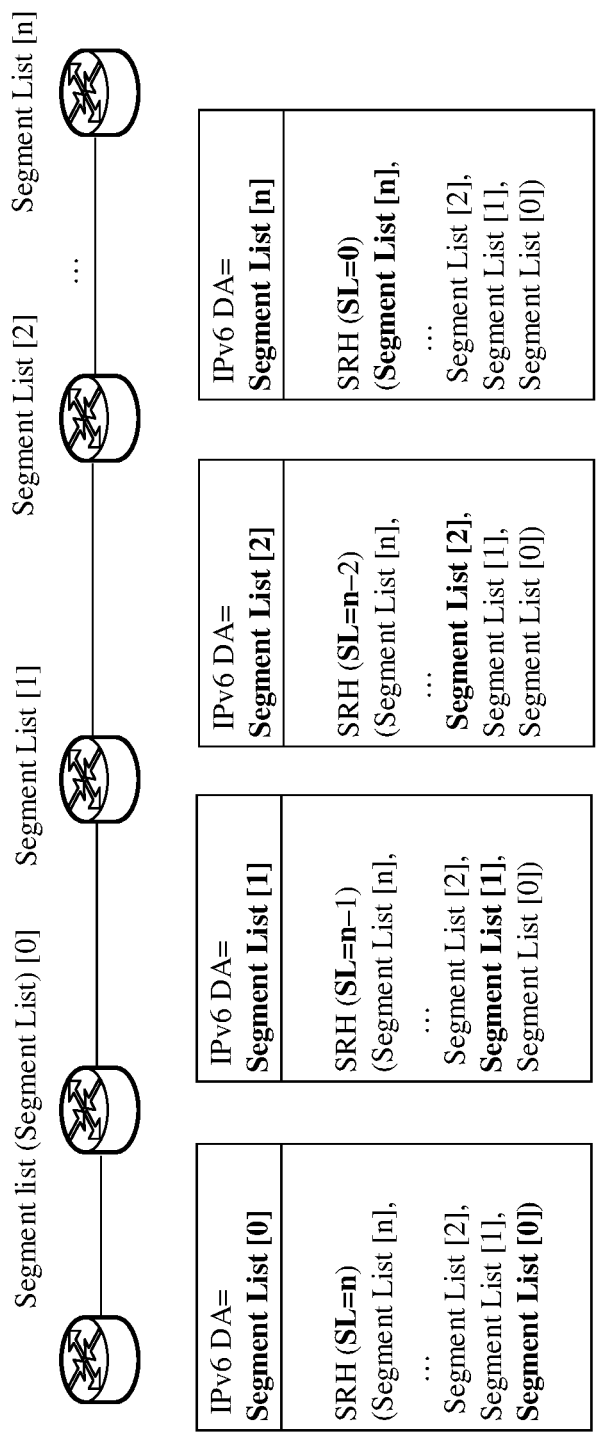
FIG. 3 is a schematic diagram of conversion of an IPv6 destination address of a packet according to an embodiment of this application.

As shown in FIG. 3, in SRv6, each time a packet passes through an SRv6 node, the Segments Left (SL) field value decreases by 1, and an IPv6 DA changes. The Segments Left and Segments List fields collaboratively determine IPv6 DA information.

If an SL value is n (n−0), an IPv6 DA value is a value of Segments List [0].

If an SL value is n−1, an IPv6 DA value is a value of Segments List [1].

If an SL value is n−2, an IPv6 DA value is a value of Segments List [2].

If an SL value is 0 (n−n=0), an IPv6 DA value is a value of Segments List [n].

(2.3) One or More TLVs

A TLV is an encoding format, and the TLV includes a type, a length, and a value (value). The SRH may include one TLV, or may include a plurality of TLVs. Different TLVs in the SRH may have a parallel relationship or a nested relationship.

(2.4) Type of a next header: The SRv6 packet may further include one or more extension headers or one or more higher-layer headers after the extension header. The Next Header is used to identify a type of a packet header immediately following the SRH. A length of the next header type field may be 8 bits.

(2.5) Header extension length (Hdr Ext Len) field: used to indicate a length of the SRH header. The length of the SRH header mainly refers to the length of the segment list, for example, the length occupied by segment list [0] to segment list [n].

(2.6) Routing type field: used to identify a routing header type, and SRH Type is 4. A length of the Routing Type field may be 8 bits.

(2.7) Last entry index field: an index of the last element of a segment list. A length of the Last Entry field may be 8 bits.

(2.8) Flags field: used to indicate some flags in a data packet. A length of the Flags field may be 8 bits.

(2.9) Tag field: used to identify a same group of data packets. A length of the Tag field may be 16 bits.

(3) Payload in the SRv6 Packet

The payload in the SRv6 packet is, for example, an IPv4 packet, an IPv6 packet, or an Ethernet (Eth) frame. The payload in the SRv6 packet may be referred to as an original packet.

The foregoing describes a structure of an SRv6 packet, and the following describes an SRv6 SID.

Figure 4:
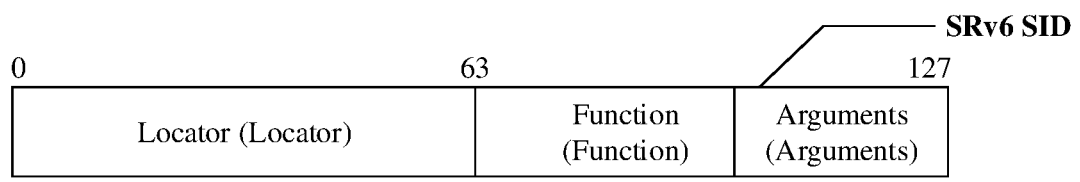
FIG. 4 is a schematic diagram of an SRv6 SID according to an embodiment of this application.

The SRv6 SID may include 128 bits. The SRv6 SID may be in a hexadecimal format. The format of the SRv6 SID may be X:X:X:X:X:X:X:X. Refer to FIG. 4. FIG. 4 is a schematic diagram of an SRv6 SID according to an embodiment of this application. The SID may include positioning information (Locator) and function information (Function), and a format of the SID is Locator:Function. Optionally, the SID may further include parameter information (Arguments), and a format of the SID is Locator.Function:Arguments. After an SRv6 SID is generated, the SRv6 SID is added to a Local SID table of the current device and is also advertised through a routing protocol. During actual forwarding, the Locator part in the SRv6 SID is used to help other nodes on a network perform routing and addressing, find a node generating the SRv6 SID, and forward the SRv6 packet to the node. The Function part is used to indicate the node generating the SRv6 SID to perform a corresponding function operation.

The Locator occupies high bits of the SID. The Locator field corresponds to an IPv6-prefix IPv6-address parameter, and a length of the Locator field is determined by a prefix-length parameter. A Locator is an IPv6 network segment under which all IPv6 addresses can be assigned as SRv6 SIDs. After a node configures the Locator, a system generates a Locator network segment route, through which the local node can be located, and all SIDs advertised by the local node can be reached through the Locator network segment route. An SRv6 Locator can be advertised through an SRv6 Locator TLV. After receiving the TLV, another SRv6-capable IS-IS device delivers a corresponding Locator to a forwarding table of the current device. An SRv6-incapable IS-IS device does not deliver a Locator to a forwarding table.

The Function occupies low bits of the SID. The Function field is also referred to as an operation code (Opcode), which may be dynamically allocated by an IGP protocol or statically configured by using the opcode command. In SRv6, the Function can be used to define an action corresponding to each segment.

The SRv6 SID is described above. SRv6 SID types may include End SID, End.X SID, End.DT4 SID, End.OTP SID, and the like. The following uses an End SID as an example to describe an SRv6 SID-based forwarding process.

Figure 5:
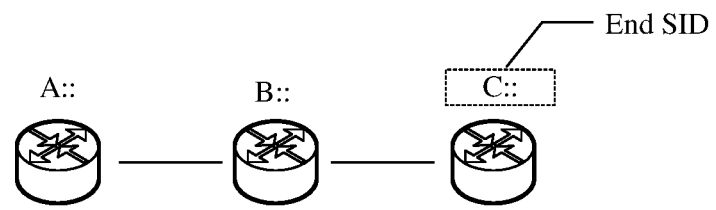
FIG. 5 is a schematic diagram of an SRv6 End SID according to an embodiment of this application.

End in End SID indicates an endpoint. End SID indicates an endpoint SID. End SID identifies a destination address prefix on the network. For example, refer to FIG. 5. FIG. 5 is a schematic diagram of an End SID according to an embodiment of this application. An End SID of node A may be A::. An End SID of node B may be B::. An End SID of node C may be C::.

An End SID-based forwarding operation may include the following steps 1 to 5.

Step 1: An SR node receives a packet.

Step 2: The SR node queries a Local SID table based on a destination address in an IPv6 header in the packet.

Step 3: The SR node determines that a SID type (SID type, also referred to as FuncType or Function type) of an active SID is End based on the Local SID table.

Step 4: The SR node continues to query an IPv6 routing forwarding table.

Step 5: The SR node forwards the packet based on an outbound interface and a next hop queried in the IPv6 routing forwarding table.

For example, refer to Table 1 below. Table 1 is an example of the local SID table. It is assumed that an IPv6 DA of the packet is 10:1::1:0/128. When receiving the SRv6 packet, the SR node queries Table 1 based on the IPv6 DA of the SRv6 packet and determines that the SID type of 10:1::1:0/128 is End. Then, the SR node continues to query the IPv6 routing forwarding table based on 10:1::1:0/128, and forwards the packet based on the outbound interface and the next hop that match the IPv6 routing forwarding table based on 10:1::1:0/128.

TABLE 1

My Local-SID End Forwarding Table

| SID | FuncType | Flaver | Locator Name | Locator ID |
|---|---|---|---|---|
| 10:1::1:0/128 | End | PSP | a | 1 |
| 20:1::1:0/128 | End | PSP | b | 2 |
| 30:1::1:0/128 | End | PSP | c | 3 |

The table header My Local-SID End Forwarding Table of Table 1 indicates a local SID table of the SRv6 End. FuncType indicates a function type. Flavor indicates a flavor, for example, penultimate segment POP of the SRH (PSP for short). Locator ID indicates an ID assigned to the Locator.

Figure 6:
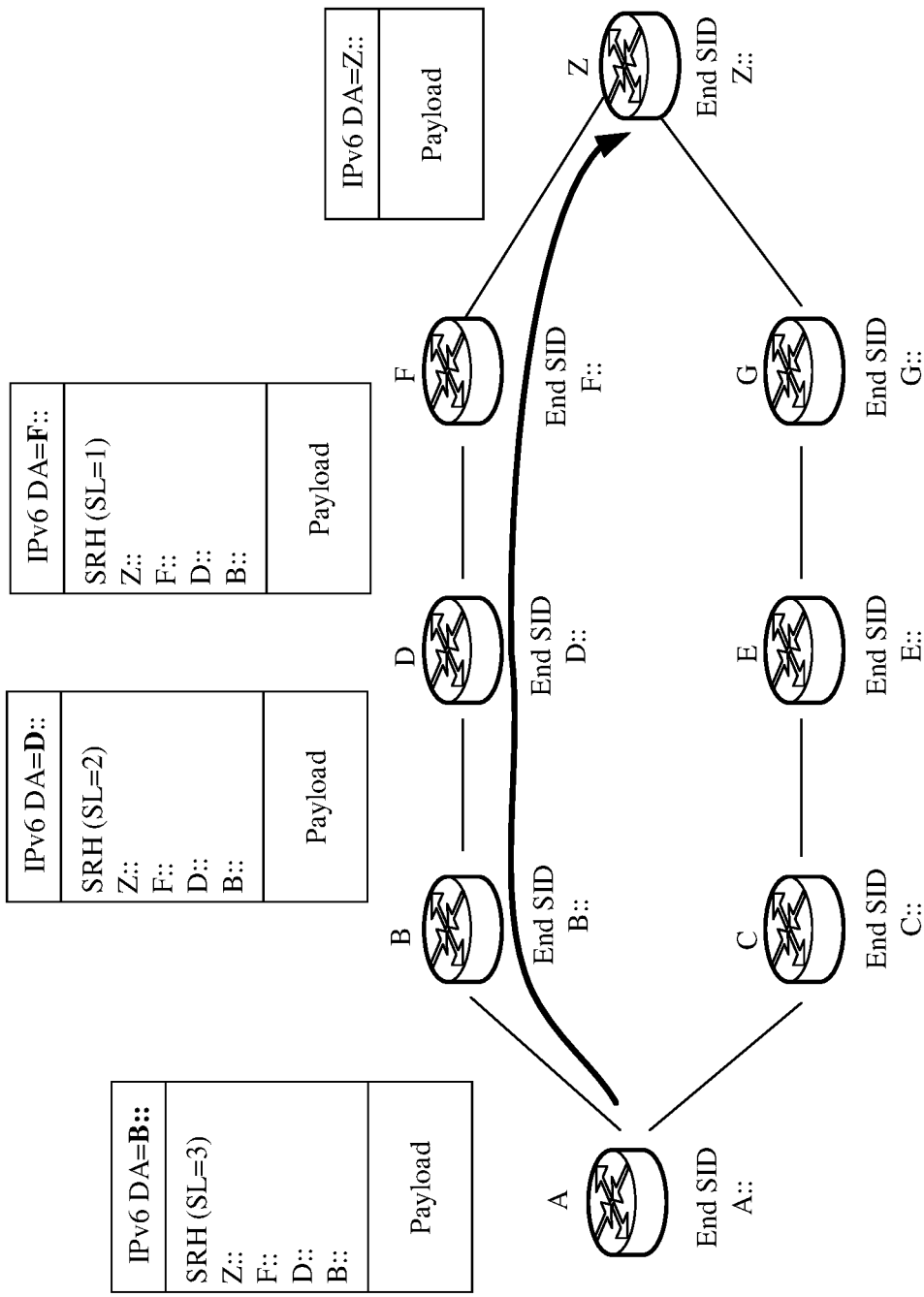
FIG. 6 is a schematic diagram of an End SID-based forwarding process according to an embodiment of this application.

Refer to FIG. 6. FIG. 6 is a schematic diagram of an End SID-based forwarding process according to an embodiment of this application. The forwarding process includes: An SRH is pushed into a packet on node A, where path information in the SRH is <Z::, F::, D::, B::>, and a destination address in an IPv6 header in the packet is B::. Each time the packet passes through a transit node, for example, a node B or a node D, the transit node queries a Local SID table based on the IPv6 DA of the packet. When the transit node determines that a type is End, the transit node continues to query an IPv6 routing forwarding table and performs forwarding based on an outbound interface and a next hop queried in the IPv6 routing forwarding table. At the same time, an SL value decreases by 1, and the IPv6 DA is converted once. When the packet arrives at node F, node F queries the Local SID table based on the destination address in the IPv6 header in the packet, determines that the type is End, continues to query the IPv6 routing forwarding table, and performs forwarding based on an outbound interface queried in the IPv6 routing forwarding table. At the same time, the SL value decreases to 0, and the IPv6 DA is changed to Z::. In this case, the path information <Z::, F::, D::, B::> is meaningless. Therefore, with the PSP flavor, node F removes the SRH, and then forwards the SRH-removed packet to node Z.

The following briefly describes the SFC technology.

In a service chain on a conventional telecommunication network, a data packet often needs to pass through various service nodes when being transmitted on the network. This ensures that the network can provide secure, fast, and stable services for users according to pre-planning. These service nodes include but are not limited to a firewall (FW), a load balancer (LB), an intrusion prevention system (IPS), and the like. Network traffic needs to pass through these service nodes in a specified sequence required by service logic to implement a required service. However, in the service chain on the conventional telecommunication network, policy steering implemented by entering complex command lines on a hardware device is difficult to maintain and change. In addition, deployment and a physical location of a VAS server are restricted. The emergence of a service function chain (SFC for short, also referred to as a service chain) effectively resolves the problem of the service chain on the conventional telecommunication network.

SFC is a technology used for providing an ordered service for an application layer. The SFC is used to logically connect services on network devices to form an ordered service combination. By adding service function path information to an original packet, the SFC enables the packet to sequentially pass through service devices along a specified path. In a conventional network architecture, the SFC technology uses a virtual network to better integrate services, which resolves the preceding problems. To resolve inflexible service deployment caused by large coupling between network devices, the SFC is independent of network planning based on an overlay topology. When an underlying physical network topology changes, deployment and activation of service nodes are not affected. As long as a bearer network route is reachable, a virtual service function chain can be mapped to a physical service node. To resolve low forwarding efficiency, the SFC encapsulates information into a packet header, so that nodes on the service function path can transfer information to each other. With the information, dynamic and flexible policy processing on data can be performed in the entire service function chain. To resolve the problem that service devices cannot be shared, the SFC separates a forwarding plane and a service plane. In this way, a user can divide service devices into resource pools, and all data traffic is classified and then steered to a plurality of service devices through the service function chain. Therefore, the offloaded data traffic reduces a performance requirement on a capability of the service device to process peak traffic, and resources on the service device are shared.

Network element types on an SFC data plane include a service classifier (SC), a service function forwarder (SFF), an SFC proxy (SFC Proxy), a service function (SF) device, and the like.

An SC is located at the ingress of an SFC domain. After a packet enters the SFC domain, traffic is classified first. A granularity of the classification is determined by a capability of the classifier and an SFC policy. A classification rule can be rough or detailed. For example, in a rough case, if all packets on a port meet an SFC rule, the packets are transmitted along service function path 1. In a detailed case, only the packet that meets a quintuple requirement can meet an SFC rule and is transmitted along service function path 2.

An SF device is configured to perform service processing on a packet. For example, the SF device may be, but is not limited to, a firewall, a load balancer, an application accelerator, lawful interception (LI), network address translation (NAT), bandwidth control, virus detection, cloud storage, deep packet inspection (DPI), intrusion detection, intrusion prevention, or the like. A physical entity of the SF device may be a computing device. The computing device may be, but is not limited to, a server, a host, a personal computer, a network device, or a terminal device. In some possible embodiments, the SF device may be implemented in such a manner: A virtual machine or a container runs on a general-purpose server that uses the X86 architecture, an application program runs on the virtual machine or the container, and the application program may be used to process a service function. SFs are classified into SRv6 encapsulation-aware SFs (SRv6-aware SF) and SRv6 encapsulation-unaware SFs (SRv6-unaware SF) based on whether an SF can be aware of SRv6 encapsulation. An SRv6-aware SF identifies and processes a received SRv6 packet. An SRv6-unaware SF does not identify an SRv6 packet and discards a received SRv6 packet.

An SFF forwards a packet received from the network to several SFs associated with the SFF. The forwarding is based on information encapsulated into the SRH. After processing the packet, the SF returns the packet to the same SFF, which finally determines whether to send the packet back to the network. A physical entity of the SFF may be a network device, for example, a router or a switch.

In the SFC field, an SF device is commonly referred to as a value-added service device (VAS), and an SFF is commonly referred to as a "Router". In the text and drawings of some embodiments of this application, the word "VAS" is used to refer to an SF device, and the word "Router" is used to refer to an SFF.

An SFC proxy is located between an SFF and several SRv6-unaware SFs associated with the SFF. The SFC proxy receives a packet from the SFF and deletes SRv6 encapsulation information on behalf of the SF. The SFC proxy sends the packet to the SRv6-unaware SF through a local logic component, receives a packet sent back by the SRv6-unaware SF, adds the SRv6 encapsulation information to the packet, and sends the packet to the SFF for processing. In the view of the SFF, the SFC proxy is equivalent to an SRv6-aware SF. Usually, the SFC proxy and the SFF are integrated on a same hardware device.

The following briefly describes the SRv6 SFC technology.

With the development of the SRv6 technology, the SRv6 SFC solution has become an excellent solution for implementing a service function chain. Based on an SR design idea and SR SID semantics, a stateless service function chain (Stateless SFC) is implemented by orchestrating topological SIDs and service SIDs in a unified manner. At present, main features of an SR SFC implementation framework include:

Feature 1: Topological SIDs and service SIDs are orchestrated in a unified manner to implement a stateless SFC.

Feature 2: For an SR-aware SF device, the SF device needs to implement basic SRv6 functions and an End.AN SID type defined for the SRv6 SFC.

The SR-aware SF refers to a device that supports SR. End.AN is used to indicate an SR-aware function (SR-aware function (native)). In other words, End.AN is used to indicate a SID type of an SRv6 service function chain function implemented by the SRv6-aware SF device. The SF device has a wide range of functions (for example, firewall filtering, DPI, and NAT). Therefore, unlike other SID types, End.AN has no specific processing logic defined as End.AS, End.AD, and End.AM. Usually, the End.AN SID type indicates that: When an SRv6 device (namely, an SF device) receives an Active SID of the local End.AN SID type, the SRv6 device performs SFC-related function processing. The actual processing of the SF device depends on a specific implementation and a configuration parameter. N in End.AN may be understood as native.

Feature 3: For an SR-unaware SF device, the SFC proxy is used to replace the SF device to process an SRH.

The SFF usually also implements an SFC proxy function. In other words, the SFF and the SFC proxy are integrated on a same device, and the device implements not only an SFF function, but also an SFC proxy function. The SR-unaware SF device refers to a device that does not support SR (SR-MPLS or SRv6).

The SRv6 SFC technology is briefly described above. The following describes in detail feature 2 and feature 3.

Figure 7:
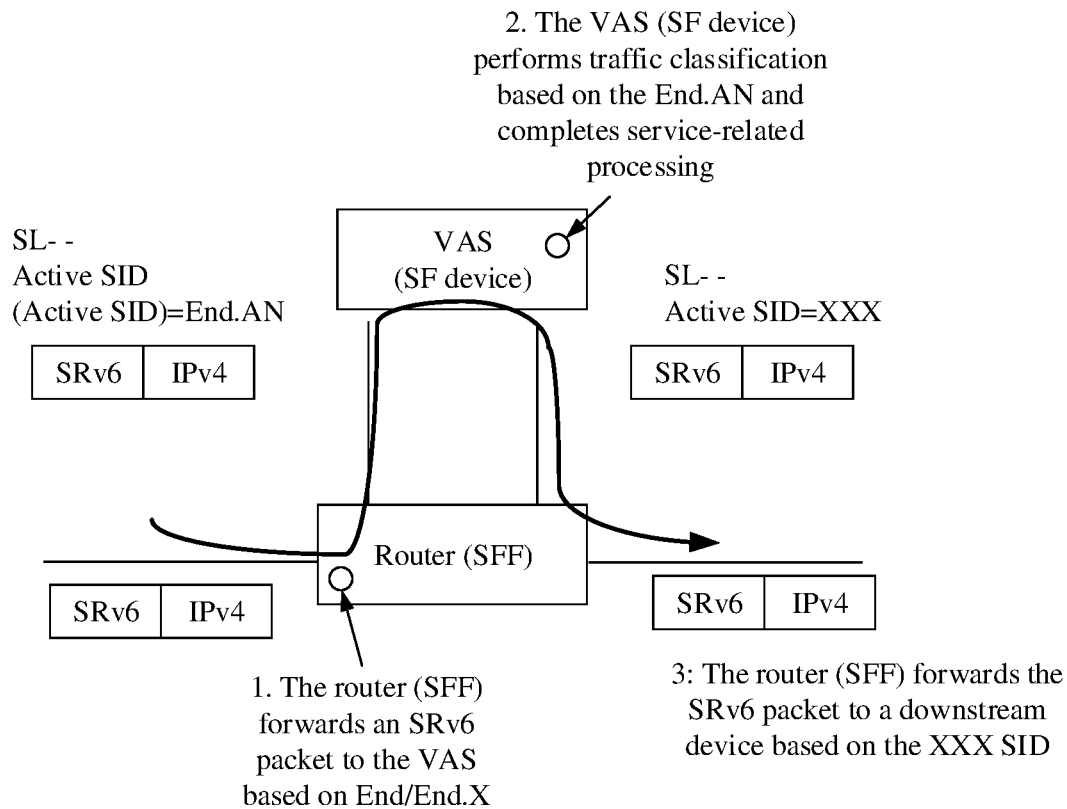
FIG. 7 is a schematic diagram of an SRv6 SFC implementation principle according to an embodiment of this application.

For an SRv6 SFC implementation solution for the SR-aware SF device, the End.AN SID may be implemented and deployed on the SR-aware SF device, and the SRv6 SFC is implemented by using the End.AN SID. For example, refer to FIG. 7. An implementation principle of the SRv6 SFC is shown in FIG. 7, and an implementation solution of the SRv6 SFC includes S101 to S103.

S101: When an SFF receives an SRv6 packet in which an Active SID is End/End.X, the SFF forwards the SRv6 packet to an SF device by using the End/End.X, where the Active SID in the packet sent by the SFF is an End.AN SID.

S102: The SF device receives the SRv6 packet forwarded by the SFF, and queries a local SID table based on a destination address of the SRv6 packet. The End.AN type is matched. The SF device performs traffic classification based on the End.AN, completes service-related processing, and returns the processed SRv6 packet to the SFF. The active SID in the SRv6 packet returned by the SF device is another SID other than the End.AN SID. In FIG. 7, the another SID than the End.AN SID is represented by XXX SID.

S103: The SFF receives the SRv6 packet returned by the SF device, and forwards the SRv6 packet to a downstream device based on the XXX SID. The downstream device is, for example, a next hop SFF of the SFF, or another SF device.

An ultimate goal of SRv6 SFC evolution includes: SF devices implement End.AN. This means that an SRv6-only network is implemented. However, it is expected that this will take a lot of time because SF devices need to implement not only forwarding functions (various policies and various actions) of the End.AN, but also control plane functions (including SID allocation and advertisement, and a northbound interface of an SDN controller).

On the SRv6-only network, the SFF only needs to implement basic SRv6 functions such as End/End.X, and even the SFF only needs to implement native IPv6 routing and forwarding.

For the foregoing SRv6 SFC implementation solution for the SR-aware SF device, the solution includes the following problems: (1) The SF device needs to support SRv6 and the End.AN SID. (2) It is not feasible for a large number of existing SF devices on a live network.

Figure 8:
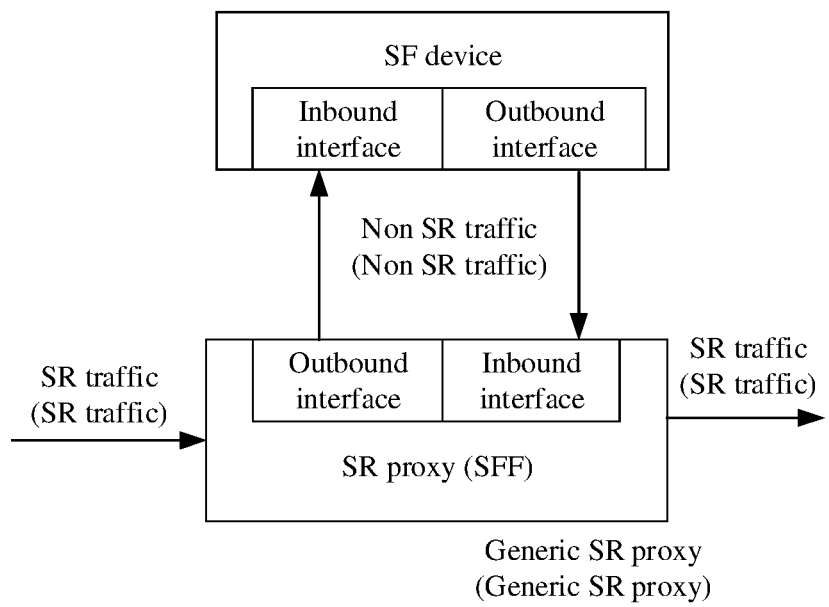
FIG. 8 is a schematic diagram of an SR proxy according to an embodiment of this application.

For the SRv6 SFC implementation solution for the SR-unaware SF device, when the SF device is an SR-unaware SF device, a proxy SID may be implemented and deployed on the SFF, and an SR proxy function is implemented by the SFF, to implement the SR SFC. Refer to FIG. 8. FIG. 8 shows a general-purpose architecture of an SR proxy. A process of the SR proxy includes the following S111 and S112.

S111: When the SR proxy receives SR traffic (SR traffic, in which each packet includes an SRH) from an upstream node, the SR proxy needs to forward the SR traffic to an SF device. If the SR proxy detects that the SF device is an SR-unaware SF device, the SR proxy strips the SRH and then sends non SR traffic (Non SR traffic, in which each packet does not include an SRH) through an outbound interface to a Service.

S112: When the SR proxy receives, through an inbound interface (IFACE IN), the non SR traffic returned by the Service, the SR proxy restores SR header encapsulation, and then forwards the SR traffic whose SR header encapsulation has been restored to a downstream device.

There are four types of SR proxies, which are also referred to as four proxy modes. Specifically, SR proxies include a static proxy, a dynamic proxy, a masquerading proxy, and a shared-memory proxy. The static proxy mode is implemented based on End.AS SID. The dynamic proxy mode is implemented based on End.AD SID. The masquerading proxy mode is implemented based on End.AM SID. In the shared-memory proxy mode, the proxy and the SF device are usually implemented on the same device, and a related SID type does not need to be defined.

The following analyzes principles and advantages of static and dynamic proxies.

Figure 9:
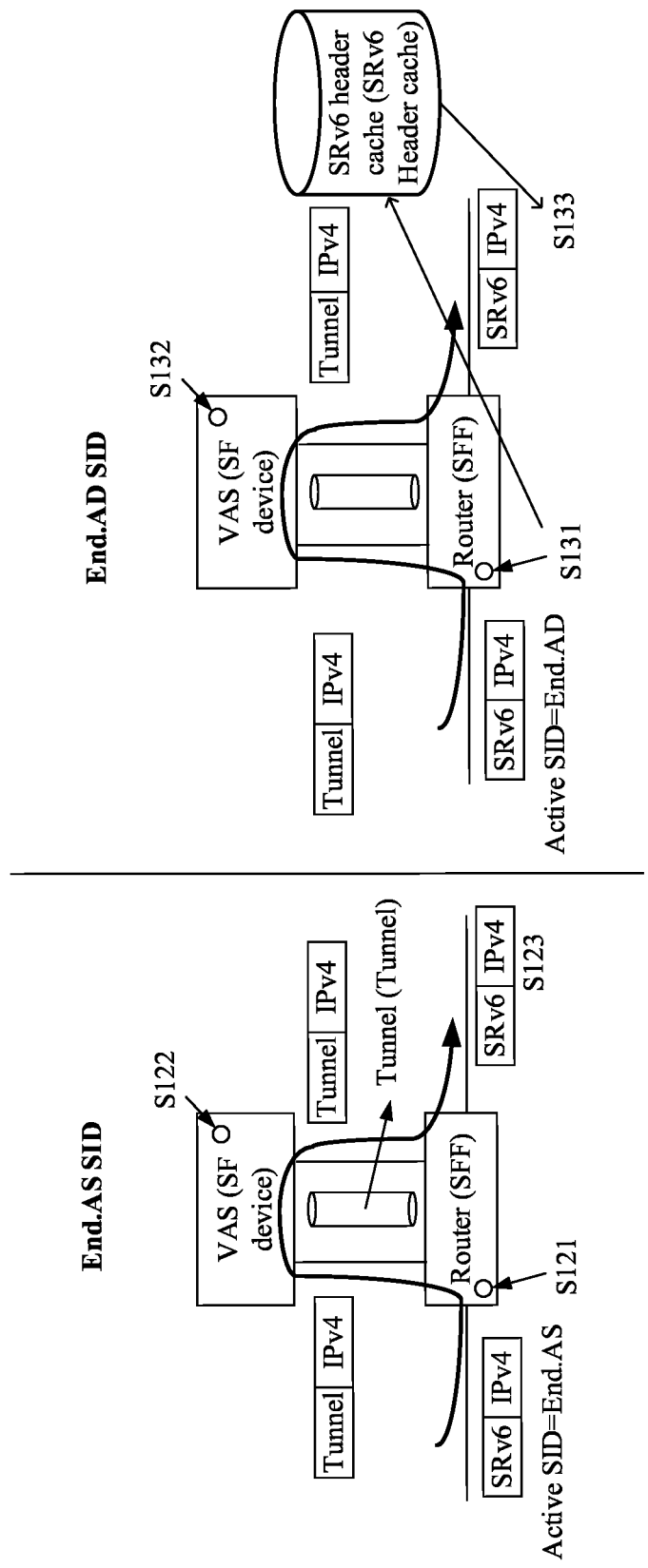
FIG. 9 is a schematic diagram of a static SR proxy according to an embodiment of this application.

Refer to FIG. 9. A static proxy method includes the following S121 to S123.

S121: An SFF receives an SRv6 packet. The SFF queries a local SID table based on a destination address of the SRv6 packet, and End.AS is matched. The SFF performs operations corresponding to the End.AS. The operations corresponding to the End.AS include the following (1) and (2).

(1) The SFF strips and discards an SRH in the SRv6 packet.

(2) The SFF re-encapsulates a tunnel header (Tunnel header), and forwards the packet including the Tunnel header to an SF device.

S122: The SF device receives the packet sent by the SFF, and terminates the Tunnel header to implement service processing. After the service processing is complete, the SF device re-encapsulates the Tunnel header and returns the packet to the SFF.

S123: The SFF device receives the packet sent by the SF device and terminates the Tunnel header. Based on an inbound interface and an access control list (ACL), the SFF restores SRH encapsulation through static configuration, and the SFF subtracts an SL and continues to forward the packet.

Through the analysis, it can be learned that advantages of the static proxy (End.AS SID) solution include that both a control plane and a forwarding plane are stateless, which are easy to implement. Disadvantages of the solution include that the SFF directly discards the SRH, causing a loss of dynamic information in the SRH, which cannot meet a future SRv6 evolution requirement, for example, in-situ flow information telemetry (iFit), application-aware networking for IPv6 (APN6), in-situ operations, administration, and maintenance (IOAM for short), and network slicing. Therefore, this solution is applicable to an SRv6 network that is relatively simple and has low dynamic performance.

There are a plurality of types of lost dynamic information. For example, refer to FIG. 10, which shows a simple scenario. To be specific, there are two different paths between R1 and R4: One path is R1→R2→R3→R4, which passes through three hops; and the other path is R1→R5→R4, which passes through two hops. R4 implements an End.AS SID function. When a packet is sent from R1 to R4, IPv6 Hoplimit values are different when the same IPv6 packet arrives at R4 through two different paths. This is because R4 cannot restore the Hoplimit value after End.AS SID processing is performed on R4. As a restored Hoplimit is configured by a user, the Hoplimit value is always a fixed value once being configured, which cannot be automatically learned or adapt to the foregoing difference.

A dynamic proxy method includes the following S131 to S133.

S131: An SFF receives an SRv6 packet. The SFF queries a local SID table based on a destination address of the SRv6 packet, and End.AD is matched. The SFF performs operations corresponding to the End.AD. The operations corresponding to the End.AD include the following (1) and (2).

(1) The SFF strips and caches an SRH in the SRv6 packet.

(2) The SFF re-encapsulates a Tunnel header, and forwards the packet including the Tunnel header to an SF device.

S132: The SF device terminates the Tunnel header to implement service processing. After the service processing is complete, the SF device re-encapsulates the Tunnel header, and returns the packet including the Tunnel header to the SFF.

S133: The SFF terminates the Tunnel header, restores SRH encapsulation based on an inbound interface and an ACL through a cache, subtracts an SL, and continues to forward the packet.

Through the analysis, it can be learned that advantages of the dynamic proxy (End.AD SID) solution include that dynamic information is not lost because of existence of the cache and requirements of future SRv6 network evolution can be met because of self-adaptation. Disadvantages of the solution include that the forwarding plane is stateful (cache), which is difficult to implement, and imposes some pressure on performance (capacity, rate, and convergence) and the like. This method is a general solution for existing SF devices on the network and SF devices that do not support the SRv6.

Through analysis of the static proxy solution and the dynamic proxy solution, it can be learned that if the SFF performs all related operations, actions of stripping the SRH and restoring the SRH will lead to excessive SFF overheads. The SF device does not need to support the SRv6. Instead, tunnel interworking between the SF device and the SFF needs to be paid attention to.

In conclusion, the problems of the solution for the SR-unaware SF device include two aspects. On the one hand, the SFF implementation is complex, and especially there is a high requirement on a forwarding chip. On the other hand, there are some application scenario limitations on various proxy modes.

Through the preceding analysis, it can be learned that the solution for the SR-aware SF and the solution for the SR-unaware SF have no significant difference on the control plane, but form two extremes on the forwarding plane. For the End.AN solution, it is complex for the SF device to implement. However, for the End.AS solution and the End.AD solution, it is complex for the SFF to implement. Obviously, the implementation and deployment of one of the SF device and the SFF are complex regardless of which solution is used.

In view of this, the following provides dilemma analysis and improvement ideas of the preceding solutions.

Figures 10, 11:
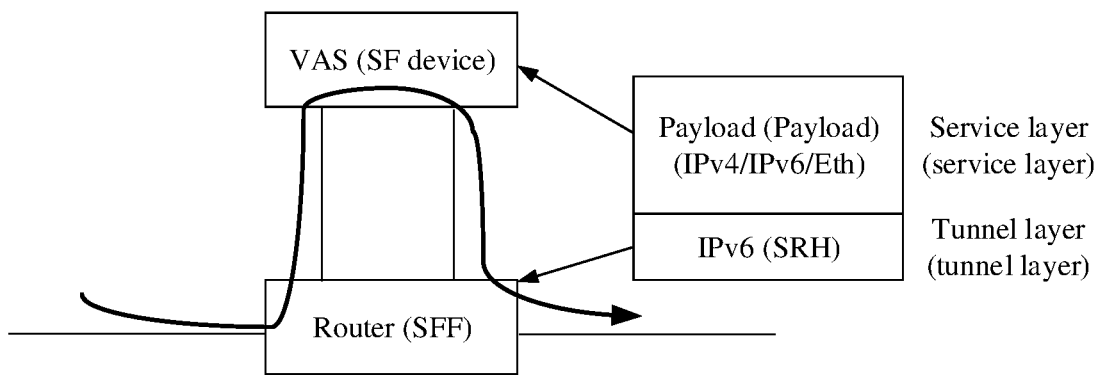
FIG. 10 is a schematic diagram of a forwarding scenario according to an embodiment of this application.
FIG. 11 is a schematic diagram of dilemma analysis of an SRv6 SFC according to an embodiment of this application.

For example, refer to FIG. 11. For an SRv6 packet, tunnel layer information is included in an SRH in the SRv6 packet. Service layer information is included in a payload in the SRv6 packet. An important advantage of the SRv6 is that a P/PE device is stateless. However, a service has a state, where is the state of the service available? The state of the service is included in the SRH in the SRv6 packet.

The SFF and SF device are two key roles on the SFC forwarding plane.

The SFF is responsible for forwarding a packet to the SF device for service processing. From a perspective of packet encapsulation, the SFF does not care about the payload part, but only about the Tunnel header (SRH) part. In addition, continuity of Tunnel layer information needs to be ensured.

The SF device mainly focuses on the payload part, but rarely focuses on the Tunnel header part (except for a requirement of carrying a small amount of information such as a VPN ID).

Due to different requirements of the SFF and the SF device, the foregoing solutions have different dilemmas in an SRv6 SFC forwarding model.

Specifically, for the End.AN solution in the SRv6 SFC technology, from a perspective of the SFF, the SF device is a common SRv6-capable next hop, and therefore the SFF does not need to perform special processing. From a perspective of the SF device, service data is hidden after the SRH, and the SF device must be aware of an End.AD SID before performing further processing. Therefore, a dilemma faced by the SF device lies that: The End.AD SID is mainly used for ACL traffic classification, and the SF device uses only the End.AD SID. However, the SFF sends the entire SRH to the SF device. In view of this, the following method embodiment may be used to ensure the continuity of Tunnel layer information while omitting a step for the SF device to parse the SRv6 SID, thereby resolving the dilemma faced by the SF device.

For the End.AS solution and End.AD solution in the SRv6 SFC technology, from a perspective of the SFF, on one hand, the SFF must replace the Tunnel header because the SF device cannot receive the SRH. However, when the Tunnel header is replaced, the Tunnel layer information loses continuity. On the other hand, to ensure the continuity of Tunnel layer information, the SFF needs to restore the Tunnel header in various manners, such as static configuration or cache. Either manner is very complex.

From a perspective of the SF device, SRv6 encapsulation-related parsing tasks are completed by the SFF. On one hand, after Tunnel layer encapsulation is changed, the SFF must map a VPN ID. Otherwise, the SF device cannot obtain the VPN ID and cannot implement VPN isolation. On the other hand, because the SF device usually does not use the Tunnel layer information, the SF device usually does not focus on the continuity of Tunnel layer information. Therefore, a dilemma faced by the SFF lies that: To implement the SRv6 technology, the SFF needs to resolve the problem that the SF device is an unaware SF device. Therefore, the SFF replaces the Tunnel header. Once the Tunnel header is replaced, the continuity of Tunnel layer information is interrupted. To prevent the continuity of Tunnel layer information, various manners such as static configuration or cache need to be used. According to the analysis, a root cause of the foregoing solutions is that Tunnel headers in previous and next packets are replaced, thereby interrupting the continuity of Tunnel layer information.

Before the following embodiments are described, inventive concepts of some embodiments of this application are first described.

In both the solution for the SR-aware SF device and the solution for the SR-unaware SF device, a basic idea is that the forwarding plane function of the SRv6 SFC is implemented by a single SF device or a single SFF. This is an extreme idea and leads to complex implementation and deployment. However, a balanced idea is adopted in this application. On a premise of ensuring the continuity of SRv6 tunnel layer information, the forwarding plane function of the SRv6 SFC can be implemented through only a small amount of modification on the SFF and the SF device. In this way, implementation of the SFF and the SF device is simplified and the requirement for the forwarding chip is greatly reduced.

Specifically, a key requirement of the SFF is how to ensure the continuity of Tunnel layer information. In some embodiments of this application, the key requirement of the SFF is met by using such a solution: The SFF does not replace Tunnel header encapsulation, and forwards the complete SRv6 packet to the SF device. The SF device does not terminate the Tunnel header, but returns the Tunnel header as original (except some control flags).

Key requirements of the SF device are to facilitate traffic classification and associate related policies and actions. In some embodiments of this application, the key requirements of the SF device are met by using such a solution: The SFF adds a related control flag to the SRv6 packet forwarded to the SF device by the SFF, to clearly identify such an application scenario. The SF device needs to identify the control flag to distinguish the SRv6 packet from a common IPv6 service packet and an IPv6 tunnel packet. When identifying such a packet, the SF device performs the following operations: First, the SF device does not terminate the SRH but returns the SRH as original to the SFF after service processing. Second, the SF device offsets the SRH part and performs service processing on the payload part.

Effects achieved by using the foregoing solutions include but are not limited to the following.

1. The continuity of Tunnel layer information is not interrupted.

2. An encapsulation format of the Tunnel header does not need to be modified, and implementation of the SFF forwarding plane is simple.

3. SFF configuration is simple (without configuring the SRH to be restored), and the forwarding plane is stateless (no cache).

4. The SF device does not need to support End.AN SIDs and SRv6 infrastructure, but only needs to support native IPv6.

Figure 14:
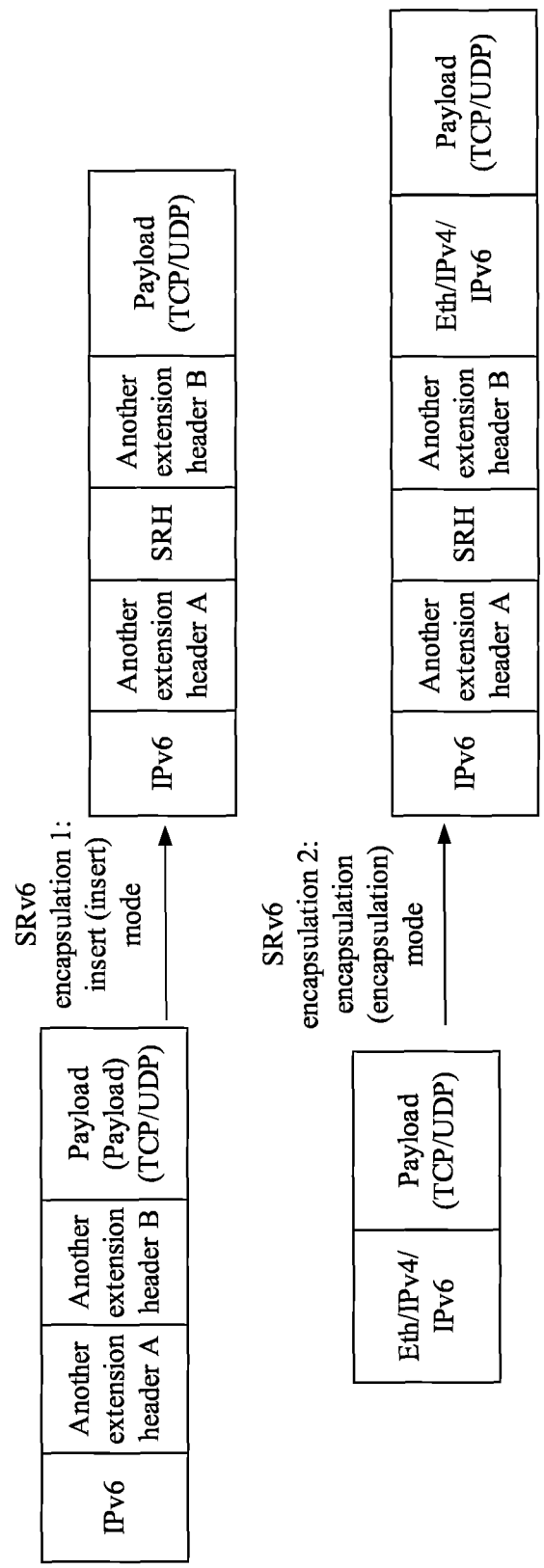
FIG. 14 is a schematic diagram of an insert mode and an encapsulation mode of an SRv6 packet according to an embodiment of this application.

A part that is denoted by the Tunnel header in the packet may depend on a specific encapsulation manner. For example, refer to FIG. 14 and related descriptions. If an insert mode is used, the Tunnel header refers to an SRH packet header. If an encapsulation mode is used, the Tunnel header refers to an entire IPv6 header including an SRH, for example, the Tunnel header refers to an outermost IPv6 standard header, an SRH, and at least one IPv6 extension header other than the SRH. That the continuity of Tunnel layer information is interrupted means that dynamic information in a packet is discarded in a process for a network device to forward the packet and consequently service functions are affected. Specifically, information transmitted on the network is carried by using an IP packet. The information can be divided into two categories: static information and dynamic information. The static information is information determined before the packet is generated. For example, the static information is configured by a user. The dynamic information is generated dynamically by using an algorithm during the generation or transmission process. The dynamic information cannot be preset by the user. For example, a source port number of TCP or UDP is dynamic information, and the source port number is usually (pseudo) randomly selected within a range. The Tunnel header also carries the dynamic information. When the End.AS SID is used, the dynamic information is discarded unconditionally. However, only static information can be specified. The loss of dynamic information affects service functions.

Figure 12:
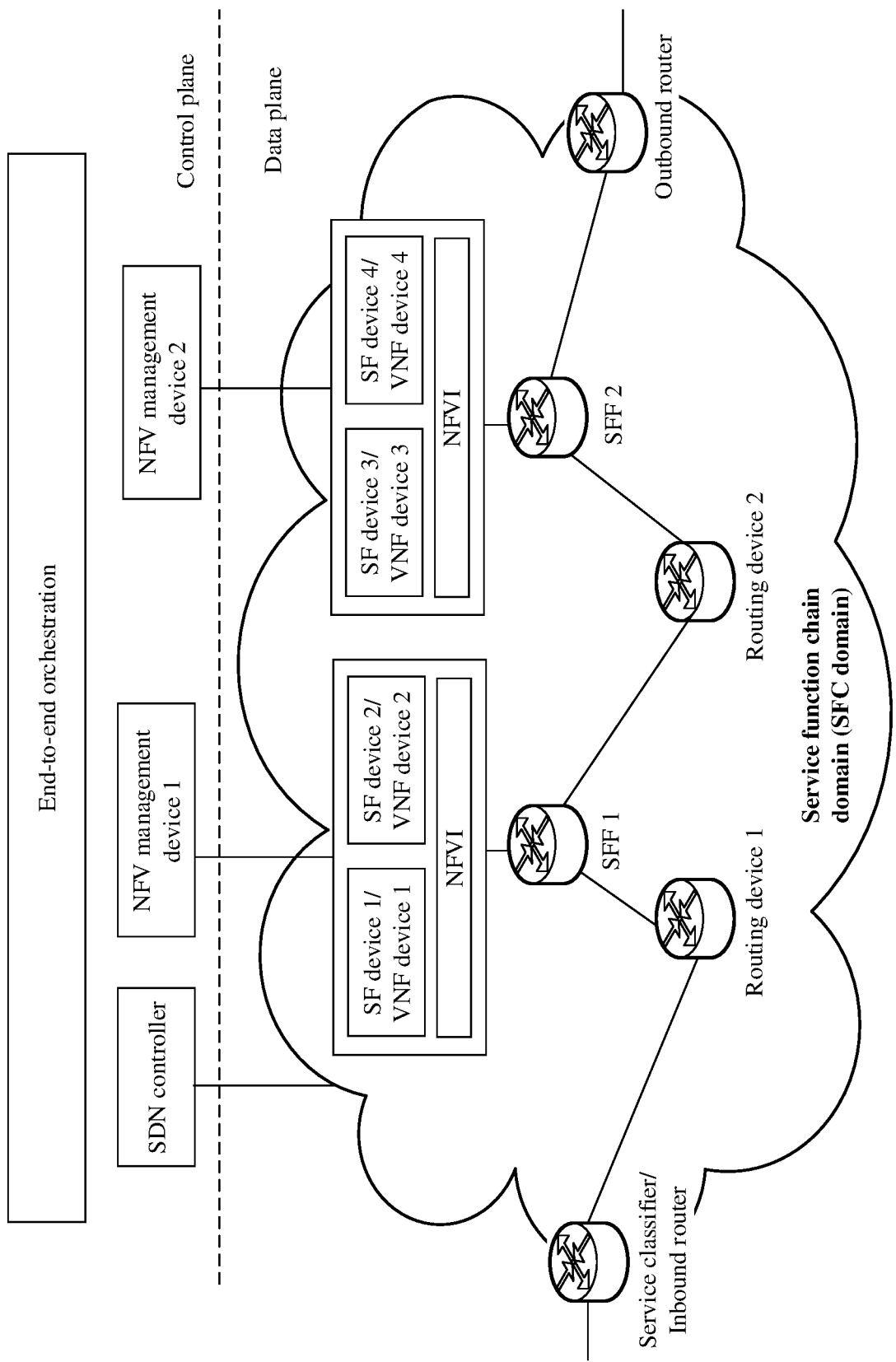
FIG. 12 is a schematic diagram of a system architecture 100 according to an embodiment of this application.

Refer to FIG. 12. An embodiment of this application provides a system architecture 100. The system architecture 100 is an example of an architecture of the SRv6 SFC.

From a perspective of a control plane, a system architecture of the SRv6 SFC includes an SDN Controller, network functions virtualization infrastructure (NFVI), and the like. The system architecture 100 includes an SDN controller, and a network function virtualization (NFV) management device 1 or NFV management device 1. These devices are examples of the control plane of the SRv6 SFC.

From a perspective of a data plane, SRv6 SFC network elements include a service classifier, an SFF, an SFC proxy, and an SF device. The system architecture 100 includes a service classifier, an SF device 1, an SF device 2, an SF device 3, or an SF device 4, and an SFF 1 or an SFF 2. These devices are examples of the data plane of the SRv6 SFC. The SF device 1, the SF device 2, the SF device 3, or the SF device 4 is an example of the SF device. The SFF 1 or the SFF 2 is an example of the SFF.

The SFF in the system architecture 100 supports SRv6 functions, including an End SID, an End.X SID, and the like. Optionally, the SFF does not need to support a SID related to an SRv6 SFC proxy function, for example, an End.AS/End.AD/End.AM SID.

The SF device in the system architecture 100 supports an IPv6 forwarding function, and also needs to support functions related to the following method 200, method 300, or method 400 in this application. Optionally, the SF device does not need to implement an SRv6-related function.

Alternatively, optionally, the SFF and the SF device are integrated into one device. For example, an SF device function is implemented on a router. For example, a board supporting functions such as NAT and FW is inserted into a router, so that the router implements the functions such as NAT and FW through the board.

It should be understood that each device in the system architecture 100 corresponds to the device described when the SR technology, the SFC technology, and the SR SFC technology are described above. For example, the SFF in the system architecture 100 corresponds to the SFF described when the SFC technology is described above. In addition, the SFF in the system architecture 100 corresponds to the SRv6 node described when the SRv6 technology is described above. The SFF in the system architecture 100 includes any function of the SFF in the SFC technology described above and the SRv6 node. The SF device in the system architecture 100 corresponds to the SF device described when the SFC technology is described above. The SF device in the system architecture 100 includes any function of the SF device described above. For brevity of description, details about the system architecture 100 are not described again.

The foregoing describes the system architecture of the SRv6 SFC by using the system architecture 100. The following uses the method 200 to the method 400 as examples to describe a method process of implementing the SRv6 SFC based on the system architecture provided above.

Figure 13:
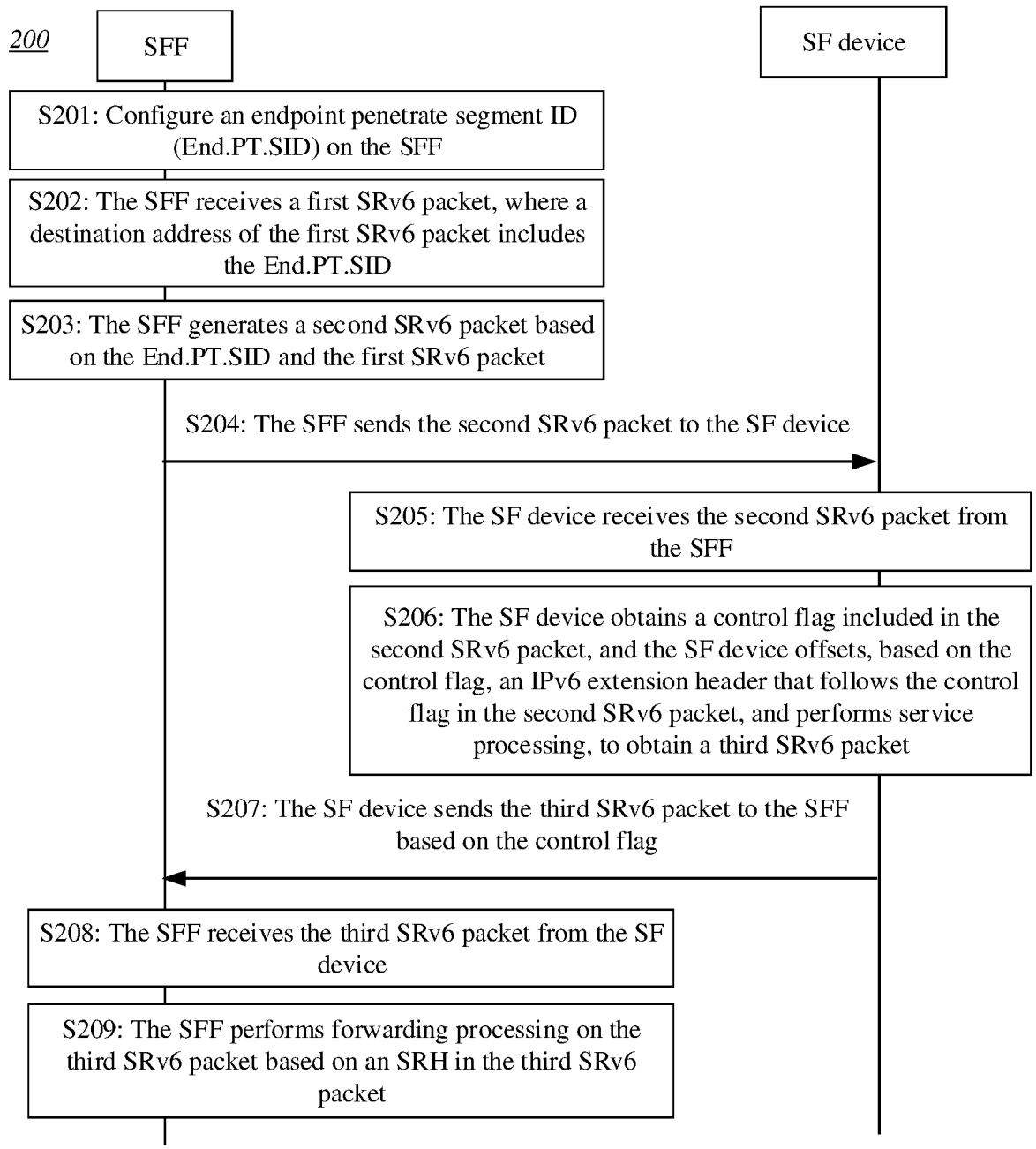
FIG. 13 is a flowchart of a method 200 for forwarding a packet in an SRv6 service function chain according to an embodiment of this application.

Refer to FIG. 13. FIG. 13 is a flowchart of a method 200 for forwarding a packet in an SRv6 service function chain according to an embodiment of this application. Interaction bodies in the method 200 include an SF device and an SFF accessed by the SF device. For example, the method 200 is performed by the SF device 1 and the SFF 1 accessed by the SF device 1 in the system architecture 100 shown in FIG. 12. For another example, the method 200 is performed by the SF device 3 and the SFF 2 accessed by the SF device 3 in the system architecture 100. The SRv6 packet forwarded by the SFF 1 and the SFF 2 may come from the traffic classifier shown in the system architecture 1.

Optionally, the method 200 is processed by a general-purpose central processing unit (CPU), by a network processor (NP), by a CPU and an NP together, or by another processor suitable for packet forwarding instead of a CPU and an NP. This is not limited in this application.

For example, the method 200 includes S201 to S209. S201 is a pre-configuration processing process of the method 200. S202 to S209 are forwarding processes of the method 200. It should be understood that a quantity of times S201 is performed may be different from a quantity of times S202 to S209 are performed. For example, S201 is performed once first, and then S202 to S209 are performed for a plurality of times.

S201: Configure an endpoint penetrate segment ID (End.PT.SID) on the SFF.

End.PT is a new SID type defined in this embodiment of this application. End indicates an endpoint. PT stands for penetrate, which represents an action of skipping an SRH. The End.PT.SID is an SRv6 SID. The SID type of the End.PT.SID is End.PT. The End.PT.SID is used to indicate the SFF to forward a received SRv6 packet to the SF device without stripping an SRH. Optionally, the SF device is a device that supports IPv6 and does not support SRv6. Optionally, the End.PT.SID is further used to indicate the SFF to encapsulate a control flag into the SRv6 packet.

Optionally, the End.PT.SID is a local SID of the SFF. The SFF stores the End.PT.SID in a local SID table of the SFF. A Locator in the End.PT.SID corresponds to the SFF, and the Locator in the End.PT.SID is used to locate the SFF. In addition, the SFF may advertise the End.PT.SID to an SRv6 network.

It should be understood that the End.PT is an example of a newly defined SID type, the End.PT SID is an example of a newly defined SID, names of the SID type and the SID are merely examples, and the SID type and the SID may also have other designations. For example, SIDs may have different names in different scenarios. For example, different vendors use different names, or different standards use different names. Naming of the SID is not used to limit a protection range of this application.

S202: The SFF receives a first SRv6 packet.

In this embodiment, to distinguish between a packet received by the SFF and a packet sent by the SFF, an SRv6 packet received by the SFF is referred to as the first SRv6 packet, an SRv6 packet sent by the SFF is referred to as a second SRv6 packet, and an SRv6 packet returned by the SF device to the SFF is referred to as a third SRv6 packet. The first SRv6 packet, the second SRv6 packet, and the third SRv6 packet all include an SRH.

There are a plurality of manners of generating the first SRv6 packet. In some embodiments, refer to FIG. 14. There are two generation modes of the first SRv6 packet. One generation mode is referred to as an insert mode, and the other generation mode is referred to as an encapsulation mode.

In the insert mode, an SRv6 packet is generated based on an IPv6 packet. A head end node inserts an IPv6 extension header SRH between an IPv6 standard header in the outermost layer of the IPv6 packet and a payload. The SRv6 packet generated in the insert mode includes, for example, an IPv6 standard header, an SRH, another IPv6 extension header other than the SRH, and a payload. For the SF device, in the SRv6 packet generated in the insert mode, the SRH belongs to Tunnel layer information, and the another IPv6 extension header other than the SRH and the payload belong to service layer information. In this embodiment, the control flag is used to control the SF device to offset the SRH, but not to offset the another IPv6 extension header other than the SRH or the payload, so that the SF device offsets the Tunnel layer information in the SRv6 packet, and processes the service layer information in the SRv6 packet. For example, the SF device performs service processing on the SRv6 packet, including processing the service layer information in the SRv6 packet, for example, processing the payload, the another IPv6 extension header, or both.

In the encapsulation mode, an SRv6 packet is generated based on an IPv4 packet, an IPv6 packet, or an Ethernet frame. A process in which the SRv6 packet is generated based on the IPv4 packet is used as an example. A head end node adds an SRH and an IPv6 standard header to an outer layer of the IPv4 packet. Optionally, the head end node further adds another IPv6 extension header other than the SRH. For the SF device, in the SRv6 packet generated in the encapsulation mode, the SRH and the another IPv6 extension header added by the head end node belong to Tunnel layer information, and a payload belongs to service layer information. In this embodiment, the control flag is used to control the SF device to offset the SRH and the another IPv6 extension header added by the head end node, so that the SF device offsets the Tunnel layer information in the SRv6 packet, and processes the service layer information in the SRv6 packet. For example, in the encapsulation mode, the SF device performs service processing on the SRv6 packet, including processing the payload.

A destination address of the first SRv6 packet includes the End.PT.SID. The SRv6 packet usually includes an outer IPv6 header and an inner original packet. The outer IPv6 header includes a DA field, and the inner original packet also includes a DA field. The destination address herein refers to a destination address carried in the DA field in the outer IPv6 header. In other words, the DA field in the outer IPv6 header in the first SRv6 packet includes the End.PT.SID. In addition, in the SRv6 field, an IPv6 DA in the SRv6 packet that matches the local SID table may be referred to as an Active SID. Therefore, it may also be said that an Active SID in the first SRv6 packet is an End.PT.SID.

S203: The SFF generates a second SRv6 packet based on the End.PT.SID and the first SRv6 packet.

After receiving the first SRv6 packet, the SFF performs forwarding processing on the first SRv6 packet based on the Active SID in the first SRv6 packet. In the SRv6 field, a processing process based on the Active SID usually includes: The SFF queries the local SID table based on the destination address in the outer IPv6 header in the first SRv6 packet, to match the destination address with a SID in the local SID table, and performs, based on the SID matched with the destination address, an operation corresponding to the SID matched with the destination address. In S203, because the Active SID in the first SRv6 packet is the End.PT.SID, the End.PT type is matched when the SFF queries the local SID table. Therefore, the SFF performs an operation corresponding to the End.PT.SID. To be specific, the SFF forwards the first SRv6 packet to the SF device without stripping the SRH.

S203 is different from SR proxy manners such as End.AS SID and End.AD SID. To be specific, the SFF does not strip the SRH in the first SRv6 packet when performing forwarding processing on the first SRv6 packet. Instead, the SFF keeps the first SRv6 packet as an encapsulation form of the SRv6 packet, so that the second SRv6 packet including the SRH is forwarded to the SF device.

There are a plurality of cases for a relationship between the SRH included in the second SRv6 packet and the SRH included in the first SRv6 packet. The following uses case A and case B for description.

Case A: The SRH included in the second SRv6 packet is different from the SRH included in the first SRv6 packet. Specifically, a segment list in the SRH included in the second SRv6 packet is the same as a segment list in the SRH included in the first SRv6 packet, and an SL in the SRH included in the second SRv6 packet is less than an SL in the SRH included in the first SRv6 packet by 1.

Case A is applicable to a manner in which the SFF updates the Active SID and then sends the packet to the SF. Specifically, the SFF first updates the Active SID in the first SRv6 packet to obtain the second SRv6 packet including an updated Active SID, and then forwards the second SRv6 packet to the SF device. Because an action of updating the Active SID is performed, the SRH included in the second SRv6 packet changes relative to the SRH included in the first SRv6 packet. For example, the SFF updates the destination address in the outer IPv6 header in the first SRv6 packet by changing the destination address from the End.PT.SID to a next SID in the segment list. The SFF subtracts 1 from a value of the SL field, so that the SL points to a next SID in the segment list, thereby updating the Active SID in the first SRv6 packet.

Case B: The SRH included in the second SRv6 packet is the same as the SRH included in the first SRv6 packet.

Case B is applicable to a manner in which the SFF updates the Active SID after receiving the packet returned by the SF device. In case B, optionally, the SFF encapsulates the SRH included in the first SRv6 packet into the second SRv6 packet, so that the second SRv6 packet includes the SRH included in the first SRv6 packet.

Optionally, the outermost IPv6 header in the second SRv6 packet is the same as the outermost IPv6 header in the first SRv6 packet. Alternatively, the outermost IPv6 header in the second SRv6 packet is different from the outermost IPv6 header in the first SRv6 packet. For example:

The SFF updates a hop limit in the outermost IPv6 header in the first SRv6 packet. For example, the SFF subtracts 1 from a value of the Hop Limit field, so that the Hop Limit in the IPv6 header included in the second SRv6 packet is 1 less than the Hop Limit in the IPv6 header included in the first SRv6 packet.

A part after the SRH in the second SRv6 packet includes a payload. A part after the SRH in the second SRv6 packet includes a payload. The second SRv6 packet and the first SRv6 packet have a same payload. Payload refers to the payload part in a packet. Based on different definitions of a payload, there may be a plurality of cases in which the second SRv6 packet and the first SRv6 packet have a same payload. The following uses case 1 and case 2 for description.

Case 1: That the second SRv6 packet and the first SRv6 packet have a same payload means that an original packet included in the second SRv6 packet is the same as an original packet included in the first SRv6 packet. For example, refer to FIG. 15. The original packet included in the first SRv6 packet is an IPv4 packet, the original packet included in the second SRv6 packet is an IPv4 packet, and the IPv4 packet included in the first SRv6 packet is the same as the IPv4 packet included in the second SRv6 packet.

Case 2: That the second SRv6 packet and the first SRv6 packet have a same payload means that a payload in an original packet included in the second SRv6 packet is the same as a payload in an original packet included in the first SRv6 packet. For example, an original packet included in the first SRv6 packet is an IPv4 packet, the IPv4 packet includes an IPv4 packet header and a payload, and the payload is a TCP packet. An original packet included in the second SRv6 packet is an IPv4 packet, the IPv4 packet includes an IPv4 packet header and a payload, and the payload is a TCP packet. The TCP packet included in the first SRv6 packet is the same as the TCP packet included in the second SRv6 packet.

The second SRv6 packet includes a control flag. Specifically, when performing forwarding processing on the first SRv6 packet, the SFF adds the control flag, so that the obtained second SRv6 packet includes the control flag. The SFF adds the control flag to the second SRv6 packet, so as to indicate, by using the control flag, the SF device how to parse and process the packet forwarded by the SFF to the SF device.

The control flag is used to indicate the SF device to offset an IPv6 extension header following the control flag in the second SRv6 packet. Optionally, the control flag is used to indicate the SF device to offset an IPv6 extension header that follows an IPv6 extension header including the control flag in the second SRv6 packet. For example, the control flag is used to indicate the SF device to offset an IPv6 extension header that follows a hop-by-hop option header in the second SRv6 packet, where the hop-by-hop option header is an example of an IPv6 extension header including the control flag.

This paragraph explains the meaning of "offset". For example, an offset object is another extension header A. Offsetting the another extension header A means that the another extension header A is not parsed but a part that follows the another extension header A in the packet is parsed and processed.

Optionally, an indication function of the control flag includes any one of the following manner (1) and manner (2).

Manner (1): The control flag is used to indicate the SF device to offset the SRH in the second SRv6 packet.

Optionally, manner (1) is applicable to a case in which the generation mode of the first SRv6 packet is the insert mode. In manner (1), the control flag is used to indicate to accurately offset the SRH. Optionally, the control flag is used to indicate to skip offsetting another IPv6 extension header other than the SRH, so that the SF device processes, as indicated by the control flag, the another IPv6 extension header other than the SRH.

For example, in an order from a header to a tail, the second SRv6 packet successively includes an IPv6 standard header, a hop-by-hop option header including a control flag, another extension header A, an SRH, another extension header B, and an IPv4 packet, where the control flag is used to indicate to offset the SRH but not to offset the another extension header A and the another extension header B. The hop-by-hop option header is an example of an IPv6 extension header including the control flag. The another extension header A and the another extension header B are examples of other IPv6 extension headers that follow the control flag. The another extension header A is an example of another IPv6 extension header that precedes the SRH. The another extension header B is an example of another IPv6 extension header that follows the SRH.

Manner (2): The control flag is used to indicate the SF device to offset the SRH in the second SRv6 packet and another IPv6 extension header other than the SRH.

The another IPv6 extension header follows the control flag in the second SRv6 packet. For example, the another IPv6 extension header is an IPv6 extension header that follows the hop-by-hop option header and precedes the payload. Optionally, the another IPv6 extension header precedes the SRH in the second SRv6 packet. Optionally, the another IPv6 extension header follows the SRH in the second SRv6 packet. The hop-by-hop option header is an example of an IPv6 extension header including the control flag.

Optionally, manner (2) is applicable to a case in which the generation mode of the first SRv6 packet is the encapsulation mode. In manner (2), the control flag is used to indicate to offset each IPv6 extension header that follows an IPv6 extension header including the control flag. For example, the control flag is used to indicate to offset each IPv6 extension header between the first IPv6 extension header that follows the hop-by-hop option header and the payload.

For example, in an order from a header to a tail, the second SRv6 packet successively includes an IPv6 standard header, a hop-by-hop option header including a control flag, another extension header A, an SRH, another extension header B, and an IPv4 packet, where the control flag is used to indicate to offset the another extension header A, the SRH, and the another extension header B.

Optionally, the control flag not only has the indication function of offsetting the IPv6 extension header described above, but also has another indication function. Specifically, the control flag is further used to indicate the SF device to return, in a process of returning the packet to the SFF, the IPv6 extension header offset in the second SRv6 packet. With the indication function of the control flag, the IPv6 extension header offset by the SF device can be returned to the SFF as original, so that the IPv6 extension header offset by the SF device is continuously transferred to a downstream network element in a service function chain through the SFF. This prevents transmission of the IPv6 extension header offset by the SF device from being interrupted on the SF device. The following describes another indication function of the control flag by using manner I and manner II.

Manner I: This manner corresponds to the foregoing manner (1) and the insert mode. The control flag is further used to indicate the SF device to return the SRH in the second SRv6 packet in the process of returning the packet to the SFF.

Manner II: This manner corresponds to the foregoing manner (2) and the encapsulation mode. The control flag is further used to indicate the SF device to return, in a process of returning the packet to the SFF, the SRH in the second SRv6 packet and the another IPv6 extension header other than the SRH that follows the control flag in the second SRv6 packet. For example, the control flag is further used to indicate to return each IPv6 extension header that is in the second SRv6 packet and that is between the first IPv6 extension header that follows the hop-by-hop option header and the payload.

When the SF device receives the second SRv6 packet, if the SF device reads the control flag in the second SRv6 packet, the SF device identifies the second SRv6 packet as a packet whose IPv6 extension header is to be offset, and processes the second SRv6 packet in a manner of offsetting the IPv6 extension header. Optionally, the control flag is marked as "CtrlInfo".

The preceding describes the control flag added by the SFF to the SRv6 packet. In some embodiments, the SFF adds not only the control flag but also target information to the SRv6 packet. The target information is information that needs to be used when the SF device performs the service processing. For example, the target information is SRv6 SFC-related information. There are a plurality of manners for the SFF to add the target information. The following uses manner 1 and manner 2 for description. Manner 1 is an example of an encapsulation manner, and manner 2 is an example of a mapping manner.

Manner 1: The SFF parses the SRH in the first SRv6 packet, and the SFF obtains target information from the SRH included in the first SRv6 packet.

In manner 1, the SFF obtains the target information from the SRH, and encapsulates the target information in the SRH in the first SRv6 packet into the second SRv6 packet.

For example, the target information includes at least one of SFC metadata and a virtual private network ID (VPN ID).

The SFC metadata includes a plurality of scenarios. For example, on a data communication network (DCN), the SFC metadata is DC context allocation information. For example, the SFC metadata includes a source node ID, a source interface ID, a tenant ID, a destination class, a source class, and an opaque service class. For example, in a Precision Time Protocol (PTP), the SFC metadata is a 32-bit PTP-based timestamp. For example, the SFC metadata is nanoseconds information. For example, in a Network Time Protocol (NTP), the SFC metadata is a 32-bit NTP-based timestamp. For example, the SFC metadata is second and fraction. For example, the SFC metadata includes a context ID, a sub/endpoint ID, and service information. For example, the SFC metadata includes a context ID, a sub/endpoint ID, and service information. For example, on a wireless access network (RAN), the SFC metadata includes at least one of quality of service (QoS)/differentiated services code point (DSCP), and an application (App) ID.

Optionally, the VPN ID is represented by a 128-bit SRv6 VPN SID. The SRv6 VPN SID is an SRv6 SID. The SRv6 VPN SID is used to identify a corresponding VPN. Specifically, function information (Function) of the SRv6 VPN SID is used to indicate a destination device to send a packet to a VPN instance, so that the packet enters a corresponding VPN from the destination device and tenant isolation is implemented. VPN SID types include but are not limited to End.DX and End.DT. Operations corresponding to an End.DX SID include decapsulating an outer IPv6 packet header and forwarding a remaining packet through an outbound interface bound to the End.DX SID. The End.DX includes but is not limited to End.DX6, End.DX4, End.DX2, or End.DX2V. Operations corresponding to an End.DT SID include decapsulating an outer IPv6 packet header, searching a VPN instance routing table based on a destination address included in a remaining packet, and forwarding the packet. The End.DT includes but is not limited to End.DT4 or End.DT6.

This paragraph describes effects of manner 1. For a purpose of service processing, the SF device may need to be aware of some information encapsulated in the SRH. However, the SF device usually cannot identify the SRH. As a result, service information in the SRH cannot be obtained, and therefore the SF device cannot perform service processing based on the service information in the SRH. However, with the manner 1, the SFF parses the SRH, and the SFF transfers the service information included in the SRH to the SF device, so that the SF device can obtain the service information included in the SRH. In addition, the SF device does not need to parse the SRH. Therefore, the manner 1 meets a requirement that the SF device performs service processing based on the service information in the SRH, and an SRv6-unaware SF device can perform service processing based on the service information in the SRH in this manner, thereby extending an application range.

Manner 2: The SFF obtains service information from the SRH in the first SRv6 packet, and queries mapping relationship information based on the service information to obtain target information.

In the manner 2, the target information is obtained by mapping the service information included in the SRH in the first SRv6 packet. Specifically, the SFF preconfigures the mapping relationship information. After the SFF obtains the service information in the SRH in the first SRv6 packet, the SFF converts the service information into target information based on the mapping relationship information, and then encapsulates the target information obtained through conversion into the second SRv6 packet. The mapping relationship information stores a correspondence between the service information and the target information. Optionally, the service information and the target information are in a one-to-one correspondence. Optionally, the service information includes at least one of the SFC metadata and the VPN ID.

Optionally, a format of the target information is different from a format of the service information included in the SRH. For example, the format of the target information is a format that is identifiable by the SF, and the format of the service information included in the SRH is a format that is not identifiable by the SF. That the SFF executes manner 2 is equivalent to performing format conversion on the service information in the SRH to obtain the target information. For example, the service information is an SRv6 VPN SID, and a format of the SRv6 VPN SID is a 128-bit IPv6 address. The format of the target information is a numeric value. Different SRv6 VPN SIDs in the mapping relationship information correspond to different numeric values.

For example, the mapping relationship information is shown in Table 2. In Table 2, 10:1::1:0/128 is an example of an SRv6 VPN SID, and 1 is an example of target information corresponding to the SID 10:1::1:0/128. 20:1::1:0/128 is an example of an SRv6 VPN SID, and 2 is an example of target information corresponding to the SID 20:1::1:0/128. 30:1::1:0/128 is an example of an SRv6 VPN SID, and 3 is an example of target information corresponding to the SID 30:1::1:0/128.

TABLE 2

| Mapping relationship information | |
|---|---|
| Service information | Target information |
| 10:1::1:0/128 | 1 |
| 20:1::1:0/128 | 2 |
| 30:1::1:0/128 | 3 |

This paragraph describes effects of manner 2. The SFF parses out the service information from the SRH, maps the service information in the SRH to target information identifiable by the SF device, and includes the target information in the second SRv6 packet sent to the SF device, so that the service information is transferred to the SF device in a form understood by the SF device, and the SF device may perform service processing based on the target information. This avoids a case in which the SF device does not identify the service information in the SRH and cannot perform service processing based on the service information, and meets a requirement that the SF device performs service processing based on the service information in the SRH. In addition, manner 2 may be applied to the SRv6-unaware SF device, thereby extending an application range.

For example, the SRH in the first SRv6 packet includes an SRv6 SID, and the SRv6 SID indicates the service information. The SFF parses the SRH in the first SRv6 packet to obtain the SRv6 SID in the SRH in the first SRv6 packet. The SFF queries the mapping relationship information based on the SRv6 SID to obtain target information corresponding to the SRv6 SID. The SRv6 SID is, for example, a VPN SID. By using the foregoing manner, the achieved effects include: The VPN SID can usually serve as a VPN ID, but for the SRv6-unaware SF device, the SF device cannot identify the SRv6 SID and therefore the VPN SID cannot be directly transferred to the SF device. As a result, it is difficult to meet a requirement that the SF device isolates traffic by using the VPN ID. However, the SFF parses out the VPN SID from the SRH, converts the service information VPN ID from an SRv6 SID format into a target information format, and transfers the target information to the SF device. In this way, the SF device can implement VPN-based traffic isolation based on the target information.

It should be understood that the SFF optionally adds the target information to the SRv6 packet. In some other embodiments, the SFF may alternatively add the control flag to the SRv6 packet, but not add the target information, so that the second SRv6 packet does not include the target information.

It should be understood that the SFC metadata and the VPN ID are examples of the target information. A specific format and content of the target information may be defined based on an application scenario and a service requirement. A specific format and content of the target information are not limited in this application.

It should be understood that the foregoing manner 1 and manner 2 are merely examples of a manner of obtaining the target information, and the SFF may alternatively obtain the target information in another manner. A source of the target information is not limited in this embodiment.

There are a plurality of implementations of carrying the control flag and the target information in the second SRv6 packet. The following describes a manner of carrying the control flag and the target information by using an example.

For an SRv6 packet, the following three mechanisms can be used to carry optional information.

Mechanism 1: A hop-by-hop option header (HBH) carries information processed by a control plane of each hop.

Figure 16:
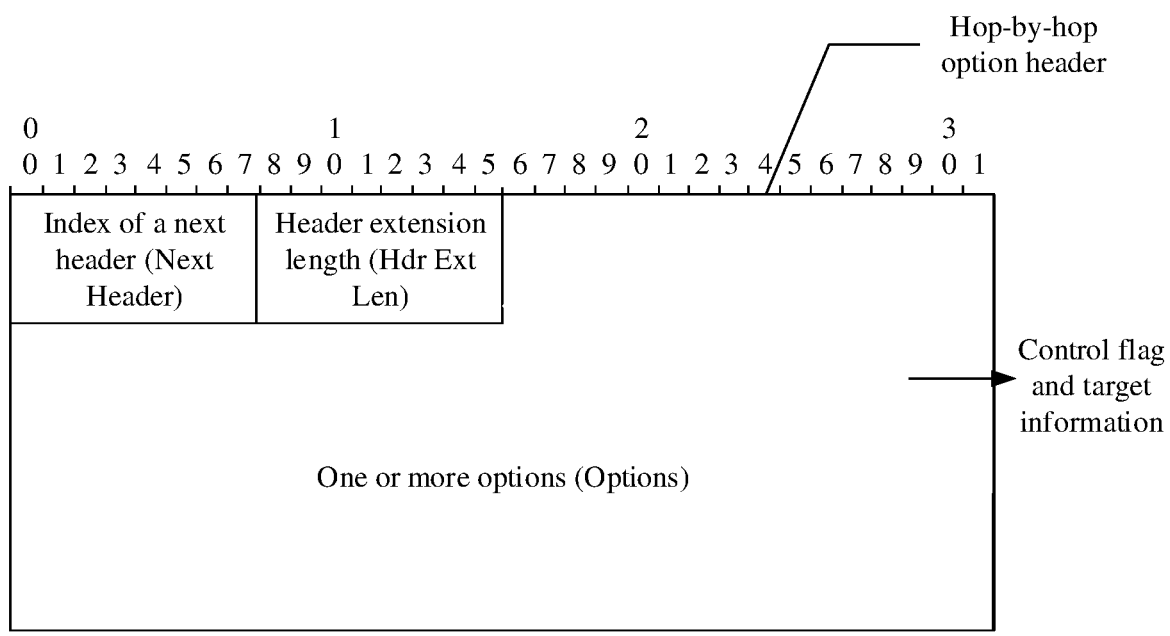
FIG. 16 is a schematic diagram of a hop-by-hop option header including a control flag according to an embodiment of this application.

This paragraph explains the hop-by-hop option header. The hop-by-hop option header is an IPv6 extension header. The hop-by-hop option header may be processed by each of transit nodes passed through in the forwarding process. When an IPv6 packet carries the hop-by-hop option header, a value of a next header field in a header preceding the hop-by-hop option header is 0. Optionally, the hop-by-hop option header is the first IPv6 extension header following an IPv6 header. In other words, the previous header of the hop-by-hop option header is the IPv6 header, and a value of a next header field in the IPv6 header is 0. Refer to FIG. 16. FIG. 16 is an example of a structure of a hop-by-hop option header. The hop-by-hop option header includes a field of an index of a next header, a header extension length (Hdr Ext Len for short) field, and at least one option. A value of the Next Header field in the hop-by-hop option header is used to indicate a type of the first header following the hop-by-hop option header. A value of the Hdr Ext Len field in the hop-by-hop option header is used to indicate a length of the hop-by-hop option header. The option in the hop-by-hop option header is also referred to as a hop-by-hop option. The hop-by-hop option is usually encoded in a format of TLV. One hop-by-hop option includes an option type field, an option length field, and a value field.

Mechanism 2: A destination option header carries information processed by a routing header transit node and/or a target node.

Mechanism 3: An SRH carries information. The SRH itself includes one or more TLVs, and the TLV in the SRH may be used to carry information such as a hash-based message authentication code (HMAC) digest and SFC metadata.

In some embodiments of this application, the foregoing mechanism 1 is used to carry at least one of a control flag and target information. The second SRv6 packet sent by the SFF includes a hop-by-hop option header, and the hop-by-hop option header includes at least one of a control flag and target information. For example, the second SRv6 packet includes an IPv6 standard header, a hop-by-hop option header including a control flag and target information, another IPv6 extension header other than the SRH and the hop-by-hop option header, and a payload. The hop-by-hop option header is the first IPv6 extension header in the second SRv6 packet. The hop-by-hop option header is placed after the IPv6 standard header and before the SRH and the another IPv6 extension header. In addition, the another IPv6 extension header other than the SRH and the hop-by-hop option header is an optional part of the second SRv6 packet. In some other embodiments, the second SRv6 packet includes an IPv6 standard header, a hop-by-hop option header including a control flag and target information, and a payload.

There are a plurality of manners of carrying the control flag or the target information by using the hop-by-hop option header. For example, a new TLV is extended in the hop-by-hop option header to carry the control flag or the target information. The TLV is an encoding format. One TLV includes a type field, a length field, and a value field. The type field is used to indicate a meaning of the TLV, the value field is used to indicate content of the TLV, and the length field is used to indicate a length of the TLV. Specifically, the hop-by-hop option header includes a TLV, and the TLV is used to carry at least one of the control flag and the target information.

There are a plurality of cases of a format of the TLV carrying the control flag and/or the target information. Optionally, the control flag and/or the target information is located in the value field of the TLV, the type field of the TLV indicates that the TLV carries the control flag and/or the target information, and a value of the type field of the TLV is, for example, a newly added type value. For example, the TLV carrying the control flag and/or the target information is an option in the hop-by-hop option header, and the option includes an option type (OptionType, OptType) field, an option length (Opt Len) field, and a control flag. The option type field indicates that the option carries the control flag and/or the target information, the option length field indicates a length of the option, and a value of the OptType field is a newly added OptType value. The added OptType value may be in a standardized or non-standardized manner based on a specific situation. For the non-standardized manner, the OptType value may use a plurality of experimental option value reserved by the Internet Assigned Numbers Authority (IANA).

There are a plurality of cases of a type of the TLV carrying the control flag and/or the target information. Optionally, the TLV carrying the control flag and/or the target information is a new top TLV, and a value of the type field of the TLV carrying the control flag and/or the target information indicates an unused top TLV type. Optionally, the TLV carrying the control flag and/or the target information is a new sub-TLV of a top TLV, and a value of the type field of the TLV carrying the control flag and/or the target information indicates an unused sub-TLV type. Optionally, the TLV carrying the control flag and/or the target information is a new sub-sub-TLV (sub-sub-TLV) of a top TLV, and a type of the TLV carrying the control flag and/or the target information is an unused sub-sub-TLV type. Whether the TLV carrying the control flag and/or the target information is a top TLV, a sub-TLV, or a sub-sub-TLV is not limited in this embodiment.

Optionally, the control flag occupies one bit in the value field of the TLV. For example, the control flag occupies bit a in the value field of the TLV. If bit a is set, the SF device is indicated to offset the IPv6 extension header that follows the control flag in the second SRv6 packet. If bit a is not set, the SF device is indicated not to offset the IPv6 extension header that follows the control flag in the second SRv6 packet.

Optionally, the SFF uses one TLV to carry the target information and the control flag. In this manner, the target information and the control flag are located in a same TLV in the second SRv6 packet. For example, the hop-by-hop option header in the second SRv6 packet includes a first TLV, where the value field of the first TLV includes the target information and the control flag, and the type field of the first TLV indicates that the first TLV carries the target information and the control flag. The target information and the control flag occupy different bits in the value field of the first TLV.

Optionally, the SFF uses two TLVs to separately carry the target information and the control flag. In this manner, the target information and the control flag are located in different TLVs in the second SRv6 packet. For example, the hop-by-hop option header in the second SRv6 packet includes a first TLV and a second TLV. The value field of the first TLV includes the control flag, and the type field of the first TLV indicates that the first TLV carries the control flag. The value field of the second TLV includes the target information, and the type field of the second TLV indicates that the second TLV carries the target information. Optionally, a value of the type field of the first TLV is different from a value of the type field of the second TLV. In other words, the first TLV is distinguished from the second TLV by using different types. Alternatively, both the first TLV and the second TLV include a flag field, and a value of the flag field of the first TLV is different from a value of the flag field of the second TLV. In other words, the first TLV is distinguished from the second TLV by using different flags.

Figure 17:
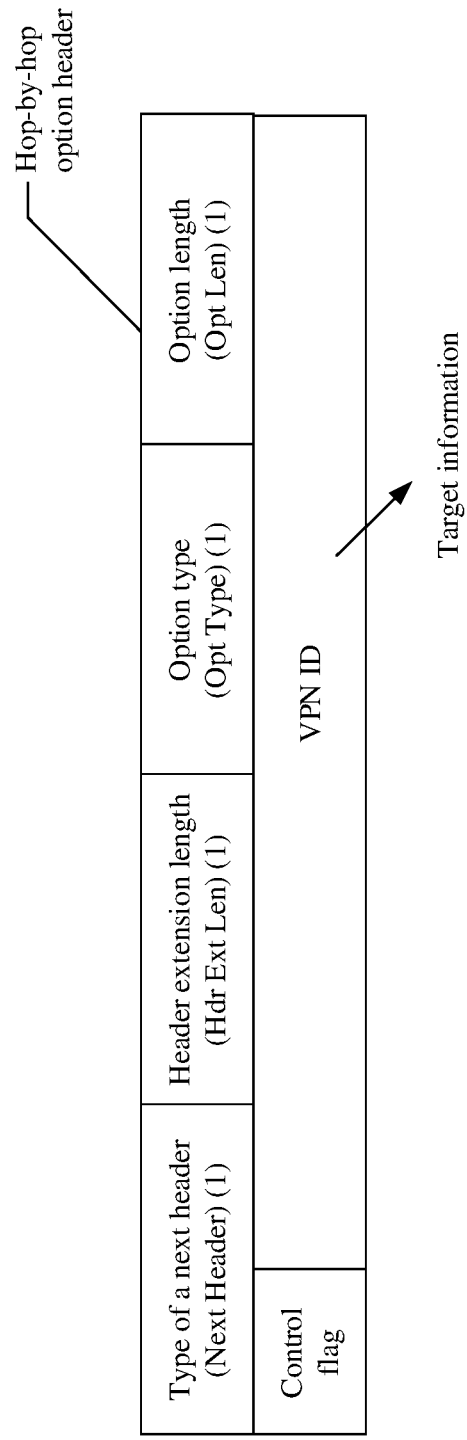
FIG. 17 is a schematic diagram of a hop-by-hop option header including a control flag and target information according to an embodiment of this application.

Refer to FIG. 17. FIG. 17 is an example of a hop-by-hop option header carrying a control flag and target information. Both the control flag and the target information are located after an option type field and an option length field. The VPN ID in FIG. 17 is an example of the target information. In FIG. 17, a number following parentheses of a field indicates a byte length of the field. For example, Next Header (1) indicates that the Next Header field occupies one byte. The Next Header and Hdr Ext Len fields are common fields of an IPv6 hop-by-hop option header defined in RFC 8200. The OptType and OptLen fields are common fields of an option defined in RFC 8200. A meaning of the OptType field shown in FIG. 17 is, for example, that the hop-by-hop option includes the control flag and the VPN ID.

Optionally, manners of carrying the control flag by using the hop-by-hop option header include the following manner a and manner b.

Manner a: An upstream device of the SFF encapsulates the hop-by-hop option header into the first SRv6 packet. Optionally, in this case, the SFF does not need to encapsulate the hop-by-hop option header, but adds an option (option, also referred to as an HBH option) to the hop-by-hop option header encapsulated by the upstream device, and includes the control flag to the added option.

In manner a, the first SRv6 packet includes a hop-by-hop option header, and the second SRv6 packet also includes a hop-by-hop option header. A relationship between the hop-by-hop option header included in the second SRv6 packet and the hop-by-hop option header included in the first SRv6 packet includes: The hop-by-hop option header included in the second SRv6 packet contains more options than the hop-by-hop option header included in the first SRv6 packet. An option added to the second SRv6 packet relative to the first SRv6 packet includes the control flag.

For example, the upstream device of the SFF encapsulates the hop-by-hop option header into the first SRv6 packet, where the hop-by-hop option header includes a first TLV. The SFF adds a second TLV to the hop-by-hop option header in the first SRv6 packet, where the second TLV includes the control flag. The second SRv6 packet includes the first TLV and the second TLV.

Manner b: The first SRv6 packet received by the SFF does not include a hop-by-hop option header. In this case, the SFF generates a hop-by-hop option header, and adds the hop-by-hop option header to the first SRv6 packet.

The following analyzes the three mechanisms and describes effects of mechanism 1 through (1) to (4).

(1) For mechanism 2, according to a standard specification, the destination option header is used to transfer information to a transit node and/or a target node. However, the SF device is usually not a transit node or a target node, selecting mechanism 1 does not comply with the standard specification. For mechanism 3, because the SF device usually does not support identifying the SRH, a manner in which the control flag is carried by using the SRH may be directly excluded.

(2) For mechanism 1, when the hop-by-hop option header is used to carry the control flag, because the hop-by-hop option header is always used as the first IPv6 extension header in an IPv6 packet, the hop-by-hop option header is easily parsed by the SF device, so that the SF device can identify the control flag and the target information based on the hop-by-hop option header, and perform related processing. Thus, the use of the hop-by-hop option header to transmit the control flag to the SF device is the most appropriate among the three mechanisms.

(3) The two most significant bits of an IPv6 Option Type define a manner for the transit node to process an unrecognized option, so that the SFF and the SF device do not need to be deployed on a one-hop IP link (on-link). According to the standard specification, an option type identifier is internally encoded, and the option type identifier indicates, by using the two most significant bits, an operation to be performed by a node processing an IPv6 packet when the option type cannot be identified. Specifically, if values of the two most significant bits of the option type identifier are 00, the node skips the option and continues processing the packet header. If values of the two most significant bits of the option type identifier are 01, the node discards the packet. If values of the two most significant bits of the option type identifier are 10, the node discards the packet. If values of the two most significant bits of the option type identifier are 11, the node discards the packet and sends an Internet Control Message Protocol (ICMP) parameter problem message to a source address of the packet when a destination address of the packet is not a multicast address.

(4) Backward compatibility can be ensured. Specifically, in this embodiment, an IPv6 option (IPv6 option) is used to carry the control flag. This can be implemented by using an experimental option type space defined in RFC 4727, thereby ensuring the compatibility of the standard.

S204: The SFF sends the second SRv6 packet to the SF device.

S205: The SF device receives the second SRv6 packet from the SFF.

S206: The SF device obtains the control flag included in the second SRv6 packet, and the SF device offsets, based on the control flag, an IPv6 extension header that follows the control flag in the second SRv6 packet, to perform service processing.

Although the packet forwarded between the SFF and the SF device (SF device) is an SRv6 packet, the SFF and the SF device have different understandings of the forwarded packet. From a perspective of the SFF, the SFF identifies the forwarded packet as an SRv6 packet. From a perspective of the SF device, the SF device identifies the packet received from the SFF as an IPv6 packet but not an SRv6 packet. In other words, after receiving the second SRv6 packet, the SF device uses the second SRv6 packet as an IPv6 packet including an IPv6 extension header. After the SF device identifies, based on the control flag, that the second SRv6 packet is the packet whose IPv6 extension header is to be offset, the SF device offsets the IPv6 extension header that follows the control flag in the second SRv6 packet. To be specific, the SF device skips the IPv6 extension header that follows the control flag, and does not parse the IPv6 extension header that follows the control flag, to implement service-related processing. Because the IPv6 extension header in the second SRv6 packet includes the SRH, the SF device offsets the SRH as an unrecognized extension header, and does not need to parse content in the SRH.

There are a plurality of implementations for the SF device to perform service processing. Optionally, the SF device performs service processing based on the payload in the second SRv6 packet. Optionally, corresponding to the insert mode, the SF device performs service processing based on the another IPv6 extension header other than the SRH that follows the IPv6 standard header or the hop-by-hop option header in the second SRv6 packet.

Figure 15:
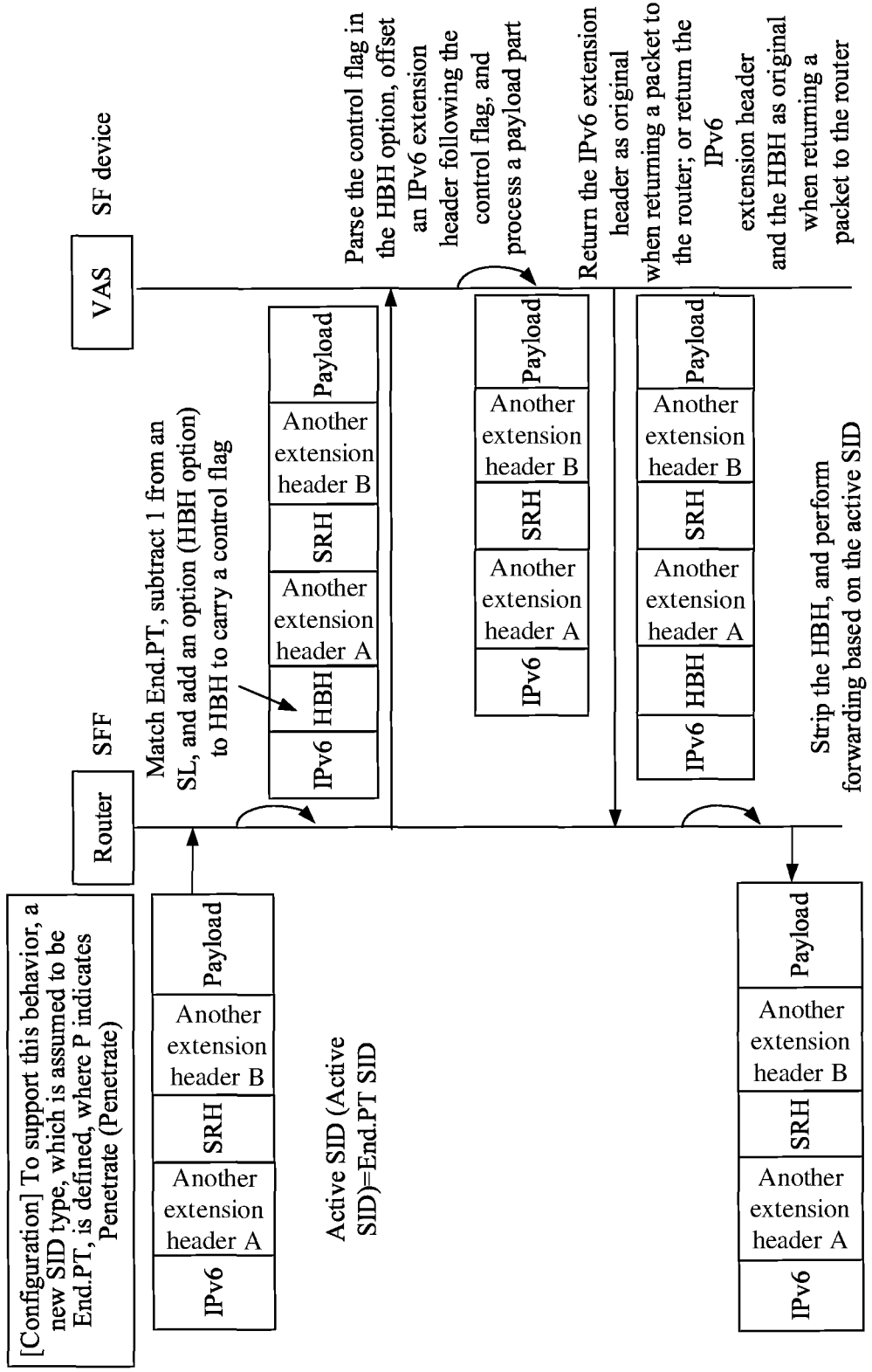
FIG. 15 is a schematic diagram of forwarding a packet in an SRv6 service function chain according to an embodiment of this application.

For example, refer to FIG. 15. In the encapsulation mode, the service processing performed by the SF device includes processing the payload part. In the insert mode, the service processing performed by the SF device includes processing the payload part; and optionally, the service processing performed by the SF device further includes processing the another extension header A and processing the another extension header B.

An offset action performed by the SF device based on the control flag refers to offsetting header encapsulation related to the SRv6. The offset action performed by the SF device includes at least the action of offsetting the SRH. Optionally, the offset action performed by the SF further includes offsetting the another IPv6 extension header other than the SRH. Optionally, the offset action performed by the SF further includes offsetting the outermost IPv6 standard header.

The following uses manner A and manner B as examples to describe how the SF device performs the offset action based on the control flag. Manner A corresponds to manner (1) in S203. For details that are not shown in manner A, refer to the foregoing manner (1). Manner B corresponds to manner (2) in S203. For details that are not shown in manner B, refer to the foregoing manner (2).

Manner A: This manner corresponds to the insert mode. When the control flag is used to indicate the SF device to offset the SRH in the second SRv6 packet, the SF device offsets the SRH in the second SRv6 packet based on the control flag. In manner A, based on the control flag, the SF device offsets the IPv6 extension header SRH, and parses and processes the another IPv6 extension header other than the SRH that follows the control flag.

Manner B: This manner corresponds to the encapsulation mode. When the control flag is used to indicate the SF device to offset the SRH in the second SRv6 packet and the another IPv6 extension header other than the SRH, the SF device offsets, based on the control flag, the SRH in the second SRv6 packet and the another IPv6 extension header other than the SRH. In manner B, based on the control flag, the SF device not only offsets the IPv6 extension header SRH, but also offsets the another IPv6 extension header other than the SRH that follows the control flag. Therefore, the first IPv6 extension header to the last IPv6 extension header that follow the IPv6 extension header (for example, hop-by-hop option header) including the control flag are not processed by the SF device.

That the SF device offsets the IPv6 extension header following the control flag is implemented, for example, by using the Hdr Ext Len field in the IPv6 extension header. Specifically, as defined in a standard, the IPv6 Routing header includes the Hdr Ext Len field. The Hdr Ext Len field is used to indicate a length of the extension header. A device that does not process the Routing header may directly offset the entire Routing header range by using the Hdr Ext Len field. The SRH is a subtype of the IPv6 Routing header. As shown in FIG. 2, the SRH also includes the Hdr Ext Len field. The Hdr Ext Len field included in the SRH is used to indicate a length of the SRH header. Therefore, the SF device may determine an end position of the SRH in the SRv6 packet based on the Hdr Ext Len field included in the SRH, and the SF device parses the packet starting from the field following the SRH, to directly offset the entire SRH. The length indicated by the Hdr Ext Len usually does not include the first eight bytes of the IPv6 extension header. In other words, the length indicated by the Hdr Ext Len is a length from the ninth byte to the last byte of the IPv6 extension header. The Hdr Ext Len may be in 8-byte units.

There are a plurality of implementations for the SF device to identify that the second SRv6 packet is a packet whose IPv6 extension header needs to be offset. The method 200 is illustrated by using an example in which the control flag is used for identification. For example, after the SF device receives the second SRv6 packet, the SF device determines whether the second SRv6 packet includes the control flag. If the SF device identifies that the second SRv6 packet includes the control flag, the SF device directly offsets the IPv6 extension header following the control flag in the second SRv6 packet.

In addition, when the second SRv6 packet further includes the target information, the SF device performs service processing on the payload based on the target information. The meaning of the target information may be preconfigured and stored on the SF device.

It should be noted that the step in which the SF device performs service processing based on the second SRv6 packet is an optional step. In some other embodiments, the SF device does not perform the step of service processing.

S207: The SF device sends a third SRv6 packet to the SFF based on the control flag.

When the control flag is further used to indicate the SF device to return the IPv6 extension header in the process of returning the packet to the SFF, the SF device always retains the offset IPv6 extension header when performing service processing based on the indication of the control flag. In the process in which the SF device returns the third SRv6 packet to the SFF, the SF device returns the offset IPv6 extension header to the SFF.

The third SRv6 packet is a packet that is obtained by the SF device by performing service processing, and the third SRv6 packet and the second SRv6 packet have a same SRH. Optionally, the payload in the third SRv6 packet is obtained by performing service processing based on the payload in the second SRv6 packet. The SF device sends the third SRv6 packet to the SFF, so as to return the SRH (namely, the SRH in the second SRv6 packet) that is previously sent to the SF device by the SFF as original to the SFF. The following uses case I and case II to describe an example in which the SF device returns the offset IPv6 extension header.

Optionally, the control flag is further used to indicate the SF device to return the hop-by-hop option header in the second SRv6 packet in the process of returning the packet to the SFF.

Case I: This case corresponds to the insert mode. The control flag is further used to indicate the SF device to return the SRH in the second SRv6 packet in the process of returning the packet to the SFF, and the SF device returns the SRH in the second SRv6 packet based on the control flag. In case I, it is optional whether the SF device returns the another IPv6 extension header other than the SRH.

Case II: This case corresponds to the encapsulation mode. The control flag is further used to indicate the SF device to return the SRH in the second SRv6 packet and the another IPv6 extension header other than the SRH in the process of returning the packet to the SFF, and the SF device returns, based on the control flag, not only the SRH in the second SRv6 packet, but also the another offset IPv6 extension header other than the SRH. For example, the SF device returns each IPv6 extension header that follows the hop-by-hop option header in the second SRv6 packet. Optionally, the SF device returns the IPv6 standard header in the second SRv6 packet.

For example, in an order from a header to a tail, the second SRv6 packet successively includes an IPv6 standard header, a hop-by-hop option header including a control flag, another extension header A, an SRH, another extension header B, and an IPv4 packet 1, where the control flag is used to indicate to offset the another extension header A, the SRH, and the another extension header B. The SF device returns the third SRv6 packet to the SFF based on the control flag, where the third SRv6 packet successively includes an IPv6 standard header, another extension header A, an SRH, another extension header B, and an IPv4 packet 2. The IPv4 packet 1 is an example of the payload in the second SRv6 packet, the IPv4 packet 2 is an example of the payload in the third SRv6 packet, and the IPv4 packet 2 is obtained after the SF device performs service processing on the IPv4 packet 1.

When the SF device performs service processing on the payload, the SF device always retains the SRH previously received from the SFF. After completing the service processing, the SF device returns the SRH previously received from the SFF as original to the SFF. Therefore, the SRH included in the SRv6 packet (the third SRv6 packet) returned by the SF device to the SFF is the same as the SRH included in the SRv6 packet (the second SRv6 packet) previously received by the SF device from the SFF, that is, the third SRv6 packet and the second SRv6 packet have a same SRH.

This paragraph describes a relationship between the hop-by-hop option header in the third SRv6 packet and the hop-by-hop option header in the second SRv6 packet by using an example. When the control flag is carried by using the hop-by-hop option header, optionally, the control flag is further used to indicate the SF device to return the hop-by-hop option header in the second SRv6 packet in the process of returning the packet to the SFF. The SF device retains the hop-by-hop option header previously received from the SFF. After completing service processing, the SF device returns the hop-by-hop option header previously received from the SFF as original to the SFF, so that the third SRv6 packet and the second SRv6 packet have a same hop-by-hop option header. Optionally, the SF device modifies the control flag, and returns another part in the hop-by-hop option header other than the control flag as original, so that the third SRv6 packet and the second SRv6 packet have different control flags. For example, the SF device adds related information to the control flag as required, so that the control flag in the third SRv6 packet has more content than the control flag in the second SRv6 packet. Optionally, the SF device modifies an option in which the control flag is located, and returns, as original, another part in the hop-by-hop option header other than the option in which the control flag is located, so that the third SRv6 packet and the second SRv6 packet have different options, and the different options include the control flag. Optionally, the SF device returns, as original, the option in which the control flag is located, but modifies another part in the hop-by-hop option header other than the option in which the control flag is located, so that the third SRv6 packet and the second SRv6 packet have a same option, and the same option includes the control flag.

This paragraph describes a relationship between the outermost IPv6 header in the third SRv6 packet and the outermost IPv6 header in the second SRv6 packet by using an example. Optionally, the SF device retains the outermost IPv6 header. After completing service processing, the SF device returns the outermost IPv6 header as original to the SFF, so that the third SRv6 packet and the second SRv6 packet have a same outermost IPv6 header. Optionally, the SF device modifies the outermost IPv6 header, so that the third SRv6 packet and the second SRv6 packet have different outermost IPv6 headers. For example, the outermost IPv6 header in the second SRv6 packet includes some information to be transferred to the SF device, where the information is used by the SF device to perform service processing. After performing service processing on the information, the SF device deletes the information, so that the outermost IPv6 header in the third SRv6 packet has less content than the outermost IPv6 header in the second SRv6 packet. Alternatively, when performing service processing, the SF device adds some information to the outermost IPv6 header, so as to transfer the information to another device in the SFC through the outermost IPv6 header. Therefore, the outermost IPv6 header in the third SRv6 packet has more content than the outermost IPv6 header in the second SRv6 packet. Optionally, whether the SF device retains the outermost IPv6 header depends on the SRv6 packet generation mode configured on the SFF. For example, if the SRv6 packet generation mode is configured as the encapsulation mode on the SFF, the SF device is configured to return the outermost IPv6 header as original. If the SRv6 packet generation mode is configured as the insert mode on the SFF, the SF device is configured to return the outermost IPv6 header as original or modify the outermost IPv6 header.

S208: The SFF receives the third SRv6 packet from the SF device.

S209: The SFF performs forwarding processing on the third SRv6 packet based on the SRH in the third SRv6 packet.

When the SFF receives the packet returned by the SF device, the SFF continues the forwarding processing based on an updated Active SID. The updated Active SID is, for example, a next SID of the End.PT.SID in the segment list. Corresponding to the foregoing case A, optionally, if the SFF uses a manner of first updating the Active SID and then sending the packet to the SF device, the SFF has updated the Active SID when performing S203, so that the destination address in the outermost IPv6 header in the second SRv6 packet is the updated Active SID. Because the SF device keeps the destination address in the outermost IPv6 header unchanged, the destination address in the outermost IPv6 header in the third SRv6 packet returned by the SF device is the updated Active SID. The SFF queries the local SID table based on the destination address in the outermost IPv6 header in the third SRv6 packet, and performs forwarding processing based on a SID in the local SID table matching the destination address. Corresponding to the foregoing case B, optionally, if the SFF uses a manner of updating the Active SID after the SF device returns the packet, the SFF does not update the Active SID when performing S203, so that the destination address in the outermost IPv6 header in the second SRv6 packet is still End.PT.SID. In this case, the destination address in the outermost IPv6 header in the third SRv6 packet returned by the SFF is the End.PT.SID. After receiving the third SRv6 packet, the SFF first updates the Active SID in the third SRv6 packet, and then performs forwarding processing based on the updated Active SID.

Optionally, in contrast to the action that the SFF encapsulates the control flag, when the SFF receives the packet returned by the SF device, the SFF strips the control flag in the third SRv6 packet to obtain a fourth SRv6 packet, and sends the fourth SRv6 packet. The fourth SRv6 packet does not include a control flag.

Optionally, when the control flag is carried by using the hop-by-hop option header, a part that the SFF strips from the packet returned by the SF is the same as a part that the SFF previously encapsulates.

For example, if the hop-by-hop option header in the third SRv6 packet is encapsulated by an upstream device of the SFF, and the SFF does not add the hop-by-hop option header, but adds an option carrying the control flag to the hop-by-hop option header, the SFF strips the option that carries the control flag, and retains another option in the hop-by-hop option header other than the option that carries the control flag. In this way, the fourth SRv6 packet does not include the option that carries the control flag, but includes the another option in the hop-by-hop option header, so that the another option in the hop-by-hop option header previously encapsulated by the upstream device is transferred to a next node.

For example, the hop-by-hop option header in the third SRv6 packet includes the first TLV added by the upstream network element of the SFF, and the second TLV added by the SFF, where the second TLV includes the control flag. The SFF strips the second TLV in the third SRv6 packet, but does not strip the first TLV, so that the fourth SRv6 packet includes the hop-by-hop option header, and the hop-by-hop option header in the fourth SRv6 packet includes the first TLV but does not include the second TLV.

If the hop-by-hop option header in the third SRv6 packet is encapsulated by the SFF, the SFF strips the hop-by-hop option header. In this case, the fourth SRv6 packet does not include the hop-by-hop option header. For example, refer to FIG. 15. The SRv6 packet received by the SFF and sent by the SF device includes an SRH, an HBH, and an IPv4 packet, and the SRv6 packet sent by the SFF later includes the SRH and the IPv4 packet. Through comparison between the two packets, the SRv6 packet sent by the SFF does not contain the HBH, and the HBH is stripped by the SFF.

This embodiment provides a method for implementing the SRv6 service function chain. The End.PT.SID is provided and used to identify that the SFF forwards the SRv6 packet to the SF device without stripping an SRH. Based on the End.PT.SID, the SFF does not strip the SRH in the SRv6 packet, but sends the SRv6 packet to the SF device. In addition, the SFF includes a control flag in the SRv6 packet, so that the control flag is used to identify a scenario in which an IPv6 extension header needs to be offset. After receiving the SRv6 packet, the SF device directly offsets the IPv6 extension header in the SRv6 packet based on the control flag, to skip the SRH and perform service processing on the payload following the SRH. By using this method, the SFF does not need to support the SRv6 SFC proxy function. To be specific, in the packet forwarding process, the SFF does not need to perform the steps of stripping the SRH and restoring the SRH, thereby greatly simplifying implementation of the SFF on the forwarding plane. In addition, the SFF does not need to generate or maintain a cache, and a stateless forwarding plane can be implemented. For the SF device, the SF device may implement the SRv6 SFC function without implementing SRv6 and End.AN SID functions.

In the preceding method 200, the control flag is used to identify that the packet is a packet whose IPv6 extension header is to be offset. In some other embodiments of this application, another manner other than the control flag may be used to identify that the packet is a packet whose IPv6 extension header needs to be offset. For example, the SF device identifies, by using a local configuration, whether the packet is a packet whose IPv6 extension header is to be offset. The following uses the method 300 and the method 400 as examples to describe how to identify, by using the local configuration, whether the packet is a packet whose IPv6 extension header is to be offset.

In some embodiments, the SF device identifies, by using a specified inbound interface, that the packet is a packet whose IPv6 extension header needs to be offset. The following uses the method 300 as an example for description. It should be understood that, for steps of the method 300 similar to those of the method 200, refer to the method 200. Details are not described in the method 300 again.

Figure 18:
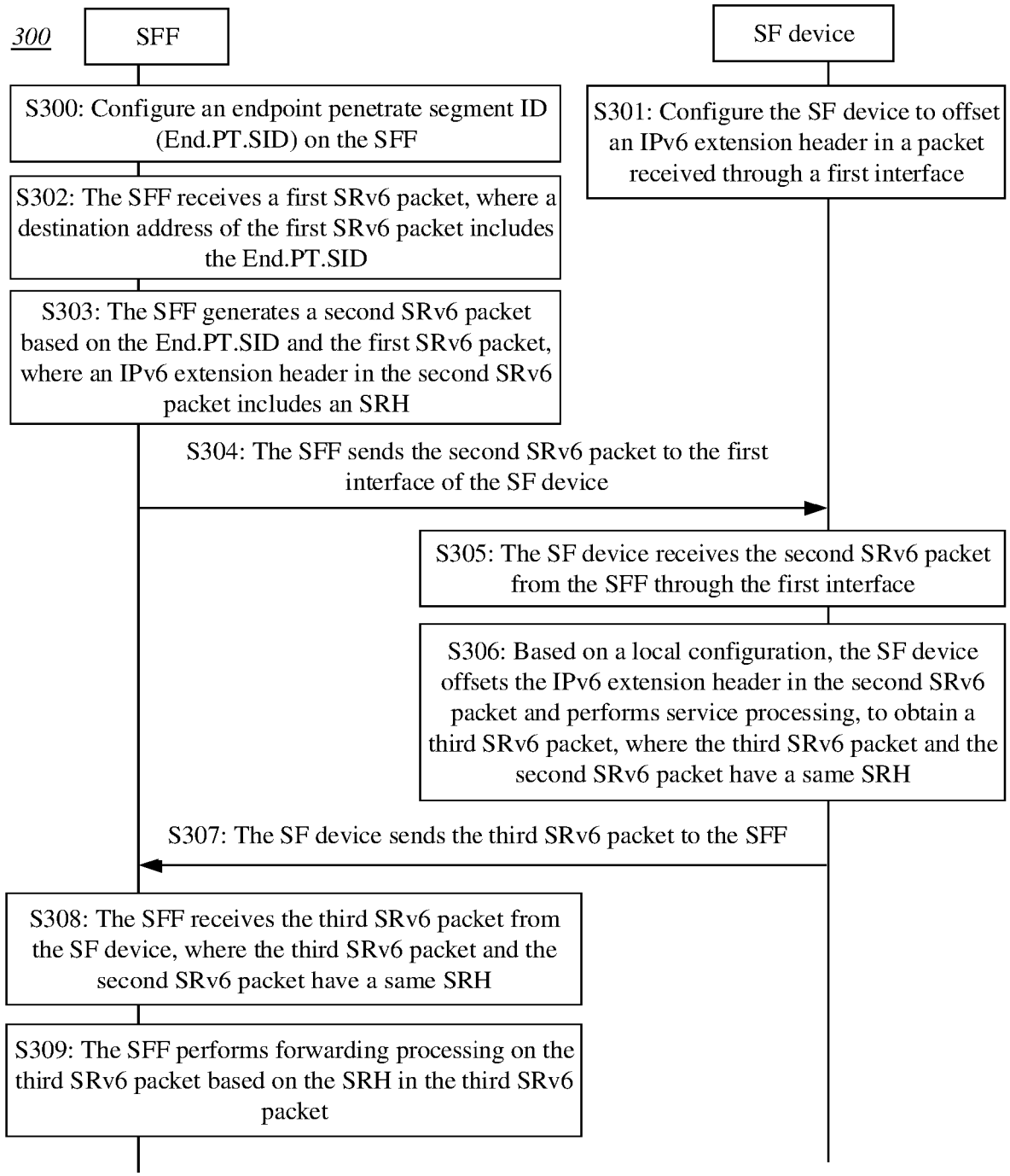
FIG. 18 is a flowchart of a method 300 for forwarding a packet in an SRv6 service function chain according to an embodiment of this application.

Refer to FIG. 18. FIG. 18 is a flowchart of a method 300 for forwarding a packet in an SRv6 service function chain according to an embodiment of this application. For example, the method 300 includes S300 to S309.

S300: Configure an End.PT.SID on an SFF.

In S301, the End.FT.SID is used to indicate the SFF to forward a received SRv6 packet to an SF device without stripping an SRH. Optionally, the End.PT.SID is further used to indicate the SFF to forward the received SRv6 packet through a specified interface (namely, a second interface below).

S301: Configure the SF device to offset an IPv6 extension header in a packet received through a first interface, and to perform service processing on a payload following the IPv6 extension header.

The first interface is one or more inbound interfaces of the SF device.

S302: The SFF receives a first SRv6 packet, where a destination address of the first SRv6 packet includes the End.FT.SID.

S303: The SFF generates a second SRv6 packet based on the End.FT.SID and the first SRv6 packet, where an IPv6 extension header in the second SRv6 packet includes an SRH, and the second SRv6 packet and the first SRv6 packet have a same payload.

S304: The SFF sends the second SRv6 packet to the first interface of the SF device.

S305: The SF device receives the second SRv6 packet from the SFF through the first interface.

Optionally, the SFF sends the second SRv6 packet through the second interface, where the second interface is an outbound interface of the SFF. A binding relationship is established between the second interface and the End.PT.SID in advance.

Different from the method 200, in the method 300, the SF device does not identify, based on a control flag, whether the packet is a packet whose IPv6 extension header is to be offset, but identifies, based on a specified interface, whether the packet is a packet whose IPv6 extension header is to be offset. For a packet received through the specified interface, the SF device determines that the packet is a packet whose IPv6 extension header is to be offset. For example, the second interface of the SFF is preconfigured as a dedicated interface used to connect to the SF device, and the SFF is configured to forward an SRv6 packet through the second interface without stripping the SRH when receiving the SRv6 packet whose Active SID is End.PT. In addition, the first interface of the SF device is preconfigured as a dedicated interface connected to the SFF, and the SF device is configured to offset the IPv6 extension header in the packet received through the first interface, and to perform service processing on the payload following the IPv6 extension header. In this way, after the SFF receives the first SRv6 packet, the SFF does not strip the SRH in the first SRv6 packet based on configuration information on the SFF, and sends the second SRv6 packet to the SF device through the second interface, so that the second SRv6 packet arrives at the first interface of the SF device. After receiving the second SRv6 packet, the SF device determines that the second SRv6 packet is received through the first interface, and based on configuration information on the SF device, the SF device offsets the IPv6 extension header in the second SRv6 packet and performs service processing on the payload following the IPv6 extension header in the second SRv6 packet.

Optionally, the second SRv6 packet further includes target information. For description of the target information, refer to related descriptions in the method 200.

S306: Based on the local configuration, the SF device offsets the IPv6 extension header in the second SRv6 packet and performs service processing on the payload following the IPv6 extension header in the second SRv6 packet, to obtain a third SRv6 packet, where the third SRv6 packet and the second SRv6 packet have a same SRH.

S307: The SF device sends the third SRv6 packet to the SFF.

S308: The SFF receives the third SRv6 packet from the SF device, where the third SRv6 packet and the second SRv6 packet have a same SRH.

S309: The SFF performs forwarding processing on the third SRv6 packet based on the SRH in the third SRv6 packet.

This embodiment provides a method for implementing the SRv6 service function chain. The End.PT.SID is provided and used to identify that the SFF forwards the SRv6 packet to the SF device without stripping the SRH. Based on the End.PT.SID, the SFF does not strip the SRH in the SRv6 packet, but sends the SRv6 packet to the SF device. In addition, an inbound interface specified on the SF device is used to identify a scenario in which an IPv6 extension header needs to be offset. The SFF sends the SRv6 packet to the inbound interface specified on the SF device. After receiving the SRv6 packet through the specified inbound interface, the SF device directly offsets the IPv6 extension header in the SRv6 packet, to skip the SRH and perform service processing on the payload following the SRH. By using this method, the SFF does not need to support the SRv6 SFC proxy function. To be specific, in the packet forwarding process, the SFF does not need to perform the steps of stripping the SRH and restoring the SRH, thereby greatly simplifying implementation of the SFF on the forwarding plane. In addition, the SFF does not need to generate or maintain a cache, and a stateless forwarding plane can be implemented. For the SF device, the SF device may implement the SRv6 SFC function without implementing SRv6 and End.AN SID functions.

In some embodiments, the SF device identifies, based on an access control list (Access Control List, ACL), that the packet is a packet whose IPv6 extension header needs to be offset. The following uses the method 400 as an example for description. It should be understood that, for steps of the method 400 similar to those of the method 200, refer to the method 200. Details are not described in the method 400 again.

Figure 19:
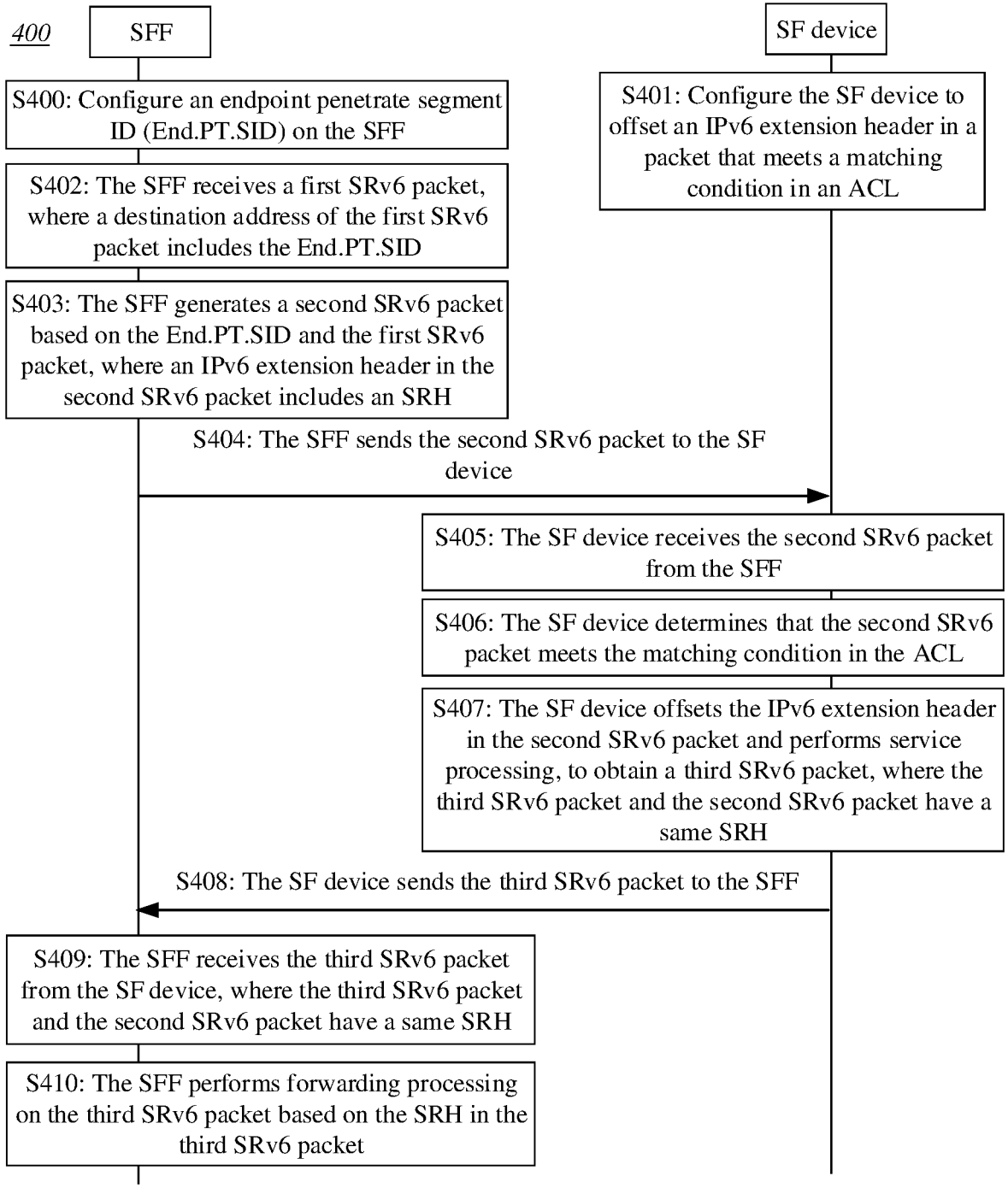
FIG. 19 is a flowchart of a method 400 for forwarding a packet in an SRv6 service function chain according to an embodiment of this application.

Refer to FIG. 19. FIG. 19 is a flowchart of a method 400 for forwarding a packet in an SRv6 service function chain according to an embodiment of this application. For example, the method 400 includes S400 to S410.

S400: Configure an End.PT.SID on an SFF.

In S401, the End.PT.SID is used to indicate the SFF to forward a received SRv6 packet to an SF device without stripping an SRH.

S401: Configure the SF device to offset an IPv6 extension header in a packet that meets a matching condition in an ACL, and to perform service processing on a payload following the IPv6 extension header.

The ACL includes a matching condition and an action. When the packet meets the matching condition, the SF device performs an action corresponding to the matching condition. In the method 300, the action corresponding to the matching condition is offsetting the IPv6 extension header and performing service processing on the payload following the IPv6 extension header.

The matching condition includes at least one of the following conditions: A source IP address of the packet matches an IP address in the ACL, a destination IP address of the packet matches an IP address in the ACL, a source port number of the packet matches a port number in the ACL, and a destination port number of the packet matches a port number in the ACL The port number is, for example, a TCP port number or a UDP port number.

S402: The SFF receives a first SRv6 packet, where a destination address of the first SRv6 packet includes the End.PT.SID.

S403: The SFF generates a second SRv6 packet based on the End.PT.SID and the first SRv6 packet, where an IPv6 extension header in the second SRv6 packet includes an SRH, and the second SRv6 packet and the first SRv6 packet have a same payload.

S404: The SFF sends the second SRv6 packet to the SF device.

S405: The SF device receives the second SRv6 packet from the SFF.

S406: The SF device determines that the second SRv6 packet meets the matching condition in the ACL The SF device determines whether the second SRv6 packet meets the matching condition in the ACL If the second SRv6 packet meets the matching condition in the ACL, the SF device performs the following S407.

S407: The SF device offsets the IPv6 extension header in the second SRv6 packet and performs service processing on the payload following the IPv6 extension header in the second SRv6 packet, to obtain a third SRv6 packet, where the third SRv6 packet and the second SRv6 packet have a same SRH.

Optionally, the second SRv6 packet further includes target information. For description of the target information, refer to related descriptions in the method 200.

S408: The SF device sends the third SRv6 packet to the SFF.

S409: The SFF receives the third SRv6 packet from the SF device, where the third SRv6 packet and the second SRv6 packet have the same SRH.

S410: The SFF performs forwarding processing on the third SRv6 packet based on the SRH in the third SRv6 packet.

This embodiment provides a method for implementing the SRv6 service function chain. The End.PT.SID is provided and used to identify that the SFF forwards the SRv6 packet to the SF device without stripping the SRH. Based on the End.PT.SID, the SFF does not strip the SRH in the SRv6 packet, but sends the SRv6 packet to the SF device. In addition, the ACL configured on the SF device is used to identify a scenario in which an IPv6 extension header needs to be offset. After the SF device receives the SRv6 packet, if the SF device determines that the SRv6 packet meets the matching condition in the ACL, the SF device directly offsets the IPv6 extension header in the SRv6 packet, to skip the SRH and perform service processing. By using this method, the SFF does not need to support the SRv6 SFC proxy function. To be specific, in the packet forwarding process, the SFF does not need to perform the steps of stripping the SRH and restoring the SRH, thereby greatly simplifying implementation of the SFF on the forwarding plane. In addition, the SFF does not need to generate or maintain a cache, and a stateless forwarding plane can be implemented. For the SF device, the SF device may implement the SRv6 SFC function without implementing SRv6 and End.AN SID functions.

It should be understood that, in the method 200, the method 300, and the method 400, the step that the SF device returns the third SRv6 packet to the SFF is optional. In some other embodiments, after receiving the second SRv6 packet from the SFF, the SF device does not return the third SRv6 packet to the SFF. For example, the SF device is a network security device, for example, a firewall, and a service processing action performed by the SF device is to discard a packet. Therefore, the SF device discards the second SRv6 packet when determining that the second SRv6 packet meets a packet discarding condition.

The foregoing describes the method 200, the method 300, and the method 400 in the embodiments of this application. The following describes the SFF and the SF device in the embodiments of this application. It should be understood that the SFF described below has any function of the SFF in the method 200, the method 300, and the method 400. The SF device described below has any function of the SF device in the method 200, the method 300, and the method 400.

Figure 20:
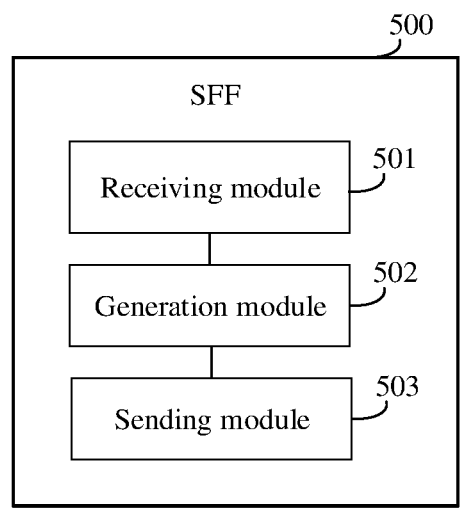
FIG. 20 is a schematic diagram of a structure of an SFF according to an embodiment of this application.

FIG. 20 is a schematic diagram of a structure of an SFF according to an embodiment of this application. As shown in FIG. 20, the SFF 500 includes: a receiving module 501, configured to perform S202, S302, or S402; a generation module 502, configured to perform S203, S303, or S404; and a sending module 503, configured to perform S204, S304, or S404.

It should be understood that the SFF 500 corresponds to the SFF in the foregoing method embodiments, and the modules and the foregoing other operations and/or functions in the SFF 500 are used to implement various steps and methods performed by the SFF in the method 200, the method 300, and the method 400, respectively. For specific details, refer to the method 200, the method 300, and the method 400. For brevity, details are not described herein again.

It should be understood that, division of the foregoing functional modules is used as an example to describe how the SFF 500 forwards a packet in an SRv6 service function chain. In actual application, the foregoing functions may be allocated to different functional modules as required. In other words, the internal structure of the SFF 500 is divided into different functional modules, to implement all or part of the functions described above. In addition, the SFF 500 provided in the foregoing embodiment belongs to a same idea as the method 200, the method 300, and the method 400. For a specific implementation process, refer to the method 200, the method 300, and the method 400. Details are not described herein again.

Figure 21:
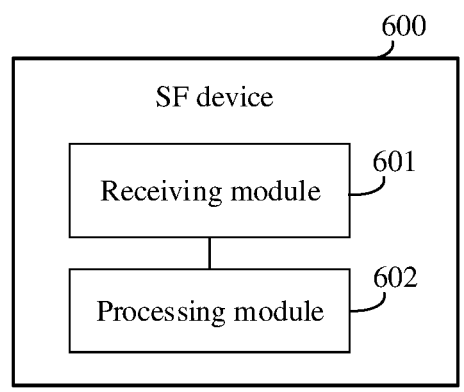
FIG. 21 is a schematic diagram of a structure of an SF device according to an embodiment of this application.

FIG. 21 is a schematic diagram of a structure of an SF device according to an embodiment of this application. As shown in FIG. 21, the SF device 600 includes: a receiving module 601, configured to perform S205, S305, or S405; and a processing module 602, configured to perform S206, S306, S406, or S407.

Optionally, the SF device 600 further includes a sending module, and the sending module is configured to perform S207, S307, or S408.

It should be understood that the SF device 600 corresponds to the SF device in the foregoing method embodiments, and the modules and the foregoing other operations and/or functions in the SF device 600 are used to implement various steps and methods performed by the SF device in the method 200, the method 300, and the method 400, respectively. For specific details, refer to the method 200, the method 300, and the method 400. For brevity, details are not described herein again.

It should be understood that, division of the foregoing functional modules is used as an example to describe how the SF device 600 forwards a packet in an SRv6 service function chain. In actual application, the foregoing functions may be allocated to different functional modules as required. In other words, the internal structure of the SF device 600 is divided into different functional modules, to implement all or part of the functions described above. In addition, the SF device 600 provided in the foregoing embodiment belongs to a same idea as the method 200, the method 300, and the method 400. For a specific implementation process, refer to the method 200, the method 300, and the method 400. Details are not described herein again.

Corresponding to the method embodiments and the virtual apparatus embodiments provided in this application, this embodiment of this application further provides an SFF and an SF device. The following describes hardware structures of the SFF and the SF device.

The SFF 700 and the SF device 800 described below correspond to the SFF and the SF device in the method 200, the method 300, and the method 400, respectively. Hardware, modules, and the foregoing other operations and/or functions in the SFF 700 and the SF device 800 are used to implement various steps and methods performed by the SFF and the SF device in the method embodiments, respectively. For a detailed process of how the SFF 700 and the SF device 800 forward a packet in an SRv6 service function chain, refer to the method 200, the method 300, and the method 400 for specific details. For brevity, details are not described herein again. Steps of the method 200, the method 300, and the method 400 are completed by using an integrated logic circuit of hardware or an instruction in a form of software in a processor of the SFF 700 and the SF device 800. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

The SFF 700 corresponds to the SFF 500 shown in FIG. 20. Functional modules in the SFF 500 are implemented by using software of the SFF 700. In other words, the functional module included in the SFF 500 is generated after the processor of the SFF 700 reads program code stored in a memory.

The SF device 800 corresponds to the SF device 600 shown in FIG. 21. Functional modules in the SF device 600 are implemented by using software of the SF device 800. In other words, the functional module included in the SF device 600 is generated after the processor of the SF device 800 reads program code stored in a memory.

Figure 22:
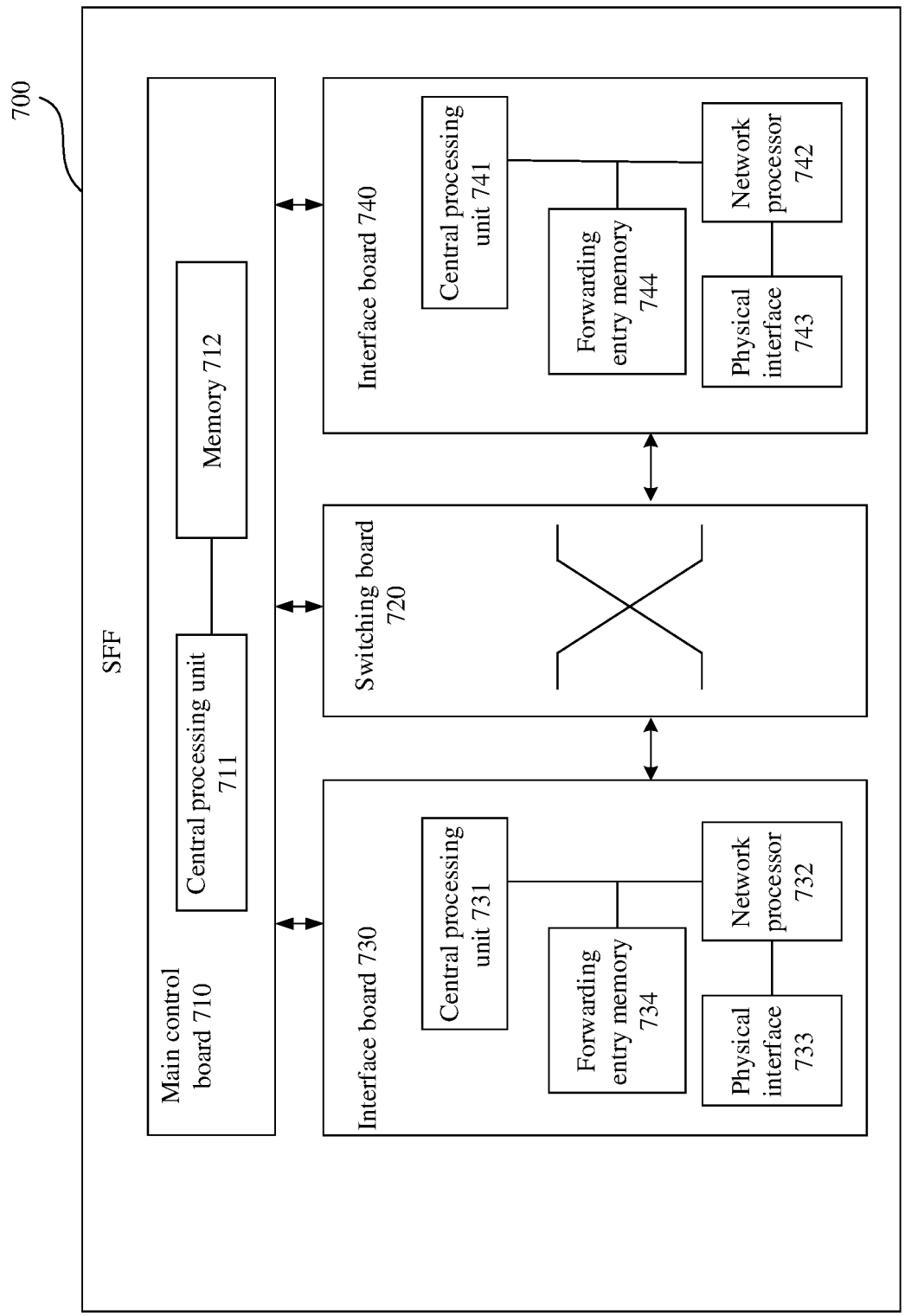
FIG. 22 is a schematic diagram of a structure of an SFF according to an embodiment of this application.

Refer to FIG. 22. FIG. 22 is a schematic diagram of a structure of an SFF according to an example embodiment of this application. The SFF 700 is, for example, a network device. The SFF 700 includes a main control board 710 and an interface board 730.

The main control board is also referred to as a main processing unit (MPU) or a route processor card. The main control board 710 is configured to control and manage components in the SFF 700, including functions of route calculation, device management, device maintenance, and protocol processing. The main control board 710 includes a central processing unit 711 and a memory 712.

The interface board 730 is also referred to as a line interface unit (LPU), a line card, or a service board. The interface board 730 is configured to provide various service interfaces and implement data packet forwarding. The service interface includes but is not limited to an Ethernet interface, a POS (Packet over SONET/SDH) interface, and the like. The Ethernet interface is, for example, a flexible Ethernet service interface (FlexE Client). The interface board 730 includes a central processing unit 731, a network processor 732, a forwarding entry memory 734, and a physical interface (physical interface card, PIC) 733.

The central processing unit 731 on the interface board 730 is configured to control and manage the interface board 730 and communicate with the central processing unit 711 on the main control board 710.

The network processor 732 is configured to implement packet forwarding processing. A form of the network processor 732 may be a forwarding chip. Specifically, the network processor 732 is configured to forward a received packet based on a forwarding table stored in the forwarding entry memory 734. If a destination address of the packet is an address of the SFF 700, the network processor 732 sends the packet to a CPU (for example, the central processing unit 711) for processing. If the destination address of the packet is not the address of the SFF 700, the network processor 732 searches the forwarding table for a next hop and an outbound interface corresponding to the destination address based on the destination address, and forwards the packet to the outbound interface corresponding to the destination address. Processing of an uplink packet includes: processing an inbound interface of the packet, and searching the forwarding table. Processing of a downlink packet includes: searching the forwarding table, and the like.

The physical interface 733 is configured to implement a physical layer interconnection function. Original traffic enters the interface board 730 from the physical interface 733, and processed packets are sent from the physical interface 733. The physical interface 733, also referred to as a subcard, may be mounted on the interface board 730, and is responsible for converting an optical/electrical signal into a packet, performing validity check on the packet, and then forwarding the packet to the network processor 732 for processing. In some embodiments, the central processing unit may also perform a function of the network processor 732, for example, implement software forwarding based on a general CPU. Therefore, the network processor 732 is not required in the physical interface 733.

Optionally, the SFF 700 includes a plurality of interface boards. For example, the SFF 700 further includes an interface board 740. The interface board 740 includes a central processing unit 741, a network processor 742, a forwarding entry memory 744, and a physical interface 743.

Optionally, the SFF 700 further includes a switching board 720. The switching board 720 may also be referred to as a switch fabric unit (SFU). When the network device has the plurality of interface boards 730, the switching board 720 is configured to complete data exchange between the interface boards. For example, the interface board 730 and the interface board 740 may communicate with each other by using the switching board 720.

The main control board 710 is coupled to the interface board 730. For example, the main control board 710, the interface board 730, the interface board 740, and the switching board 720 are connected to a system backplane through a system bus to implement interworking. In a possible implementation, an inter-process communication protocol (IPC) channel is established between the main control board 710 and the interface board 730, and communication is performed between the main control board 710 and the interface board 730 by using the IPC.

Logically, the SFF 700 includes a control plane and a forwarding plane. The control plane includes the main control board 710 and the central processing unit 731. The forwarding plane includes various components that perform forwarding, such as the forwarding entry memory 734, the physical interface 733, and the network processor 732. The control plane performs functions such as routing, generating a forwarding table, processing signaling and a protocol packet, and configuring and maintaining a device status. The control plane delivers the generated forwarding table to the forwarding plane. At the forwarding plane, the network processor 732 searches the forwarding table delivered by the control plane to forward packets received by the physical interface 733. The forwarding table delivered by the control plane may be stored in the forwarding entry memory 734. In some embodiments, the control plane and the forwarding plane may be totally separated, and are not on a same device.

For example, the method 200, the method 300, or the method 400 is performed on the interface board 730. The physical interface 733 receives a first SRv6 packet, and sends the first SRv6 packet to the network processor 732. The network processor 732 generates a second SRv6 packet based on the End.PT.SID and the first SRv6 packet, and sends the second packet through the physical interface 733 based on information such as the outbound interface after completing link layer encapsulation, so that the second packet is transmitted to the SF device. A process of executing the method 200, the method 300, or the method 400 on the interface board 740 is similar.

It should be understood that the receiving module 501 and the sending module 503 in the SFF 500 are equivalent to the physical interface 733 in the SFF 700, and the generation module 502 in the SFF 500 may be equivalent to the network processor 732 or the central processing unit 711.

It should be understood that, in this embodiment of this application, an operation on the interface board 740 is consistent with an operation on the interface board 730. For brevity, details are not described again. It should be understood that the SFF 700 in this embodiment may correspond to the SFF in the foregoing method embodiments. The main control board 710 and the interface board 730 and/or 740 in the SFF 700 may implement functions of the SFF and/or various steps performed by the SFF in the foregoing method embodiments. For brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may be one or more physical interfaces on an interface board. There may be no switching board or may be one or more switching boards. When there are a plurality of switching boards, load sharing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. A specific architecture that is to be used depends on a specific networking deployment scenario. This is not limited herein.

Figure 23:
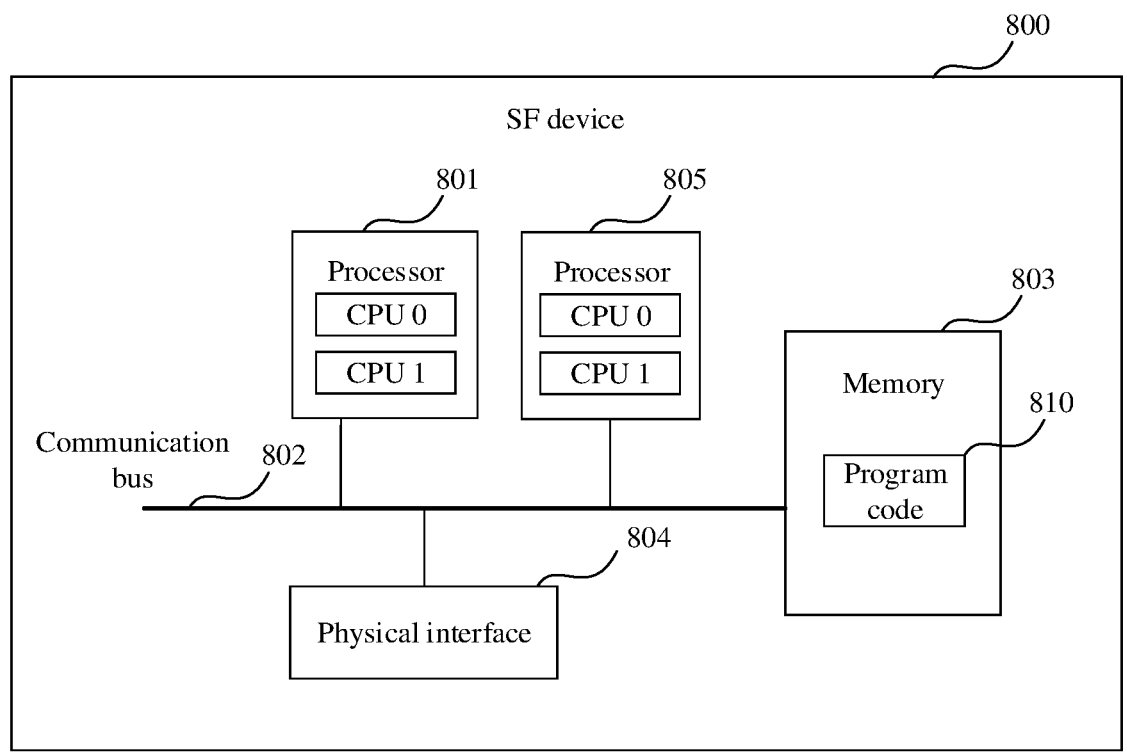
FIG. 23 is a schematic diagram of a structure of an SF device according to an embodiment of this application.

Refer to FIG. 23. FIG. 23 is a schematic diagram of a structure of an SF device 800 according to an example embodiment of this application. For example, the SF device 800 may be a computing device, for example, a host, a server, or a personal computer. The SF device 800 may be implemented by a general bus architecture.

The SF device 800 may be any device involved in all or some of the content described in the method embodiments, for example, 8888. The SF device 800 includes at least one processor 801, a communication bus 802, a memory 803, and at least one physical interface 804.

The processor 801 may be a general-purpose central processing unit (CPU), a network processor (NP), or a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The communication bus 802 is used to transmit information between the foregoing components. The communication bus 802 may be classified into an address bus, a data bus, a control bus, or the like. For ease of representation, only one thick line is used to represent the bus in FIG. 23, but this does not mean that there is only one bus or only one type of bus.

The memory 803 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blu-ray optical disc, or the like), a magnetic disk storage medium or another magnetic storage device, or any other medium capable of carrying or storing expected program code in a form of an instruction or a data structure and capable of being accessed by a computer. This is not limited thereto. The memory 803 may exist independently, and is connected to the processor 801 through the communication bus 802. Alternatively, the memory 803 may be integrated with the processor 801.

The physical interface 804 uses any transceiver-like device for communicating with another device or a communication network. The physical interface 804 includes a wired physical interface, and may alternatively include a wireless physical interface. The wired physical interface may be, for example, an Ethernet interface. The Ethernet interface may be an optical interface, an electrical interface, or a combination thereof. The wireless physical interface may be a wireless local area network (WLAN) interface, a cellular network physical interface, or a combination thereof.

During specific implementation, in an embodiment, the processor 801 may include one or more CPUs, for example, a CPU 0 and a CPU 1 shown in FIG. 23.

During specific implementation, in an embodiment, the SF device 800 may include a plurality of processors, for example, the processor 801 and the processor 805 shown in FIG. 23. Each of the processors may be a single-core (single-CPU) processor or may be a multi-core (multi-CPU)

processor. The processor herein may refer to one or more devices, circuits, and/or processing cores configured to process data (such as computer program instructions).

During specific implementation, in an embodiment, the SF device 800 may include an output device 806 and an input device 807. The output device 806 communicates with the processor 801, and may display information in a plurality of manners. For example, the output device 806 may be a liquid crystal display (LCD), a light-emitting diode (LED) display device, a cathode ray tube (CRT) display device, a projector, or the like. The input device 807 communicates with the processor 801, and may receive input of a user in a plurality of manners. For example, the input device 807 may be a mouse, a keyboard, a touchscreen device, a sensor device, or the like.

In some embodiments, the memory 803 is configured to store program code 810 for executing the solutions of this application, and the processor 801 may execute the program code 810 stored in the memory 803. In other words, the SF device 800 may implement the method 200, the method 300, or the method 400 provided in the method embodiments by using the processor 801 and the program code 810 in the memory 803.

It should be understood that the SF device 800 in this embodiment of this application may correspond to the SF device in the foregoing method embodiments. The processor 801, the physical interface 804, and the like in the SF device 800 may implement functions of the SF device and/or various steps and methods performed by the SF device in the foregoing method embodiments. For brevity, details are not described herein.

It should be understood that the receiving module 601 and the sending module in the SF device 600 are equivalent to the physical interface 804 in the SF device 800, and the processing module 602 in the SF device 600 may be equivalent to the processor 801 in the SF device 800.

Figure 24:
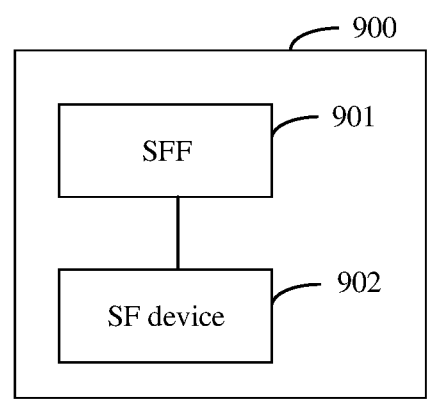
FIG. 24 is a schematic diagram of a structure of a network system according to an embodiment of this application.

Refer to FIG. 24. An embodiment of this application provides a network system 900. The system 900 includes an SFF 901 and an SF device 902. Optionally, the SFF 901 is an SFF 500 or an SFF 700, and the SF device 902 is an SF device 600 or an SF device 800.

A person of ordinary skill in the art may be aware that, the method steps and units that are described with reference to the embodiments disclosed in this specification can be implemented by electronic hardware, computer software, or a combination thereof. To clearly describe interchangeability between the hardware and the software, the foregoing has generally described steps and compositions of each embodiment based on functions. Whether the functions are performed by the hardware or the software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented by using some interfaces, indirect couplings or communication connections between the apparatuses or modules, or electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments of this application.

In addition, functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for indicating a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In this application, terms such as "first" and "second" are used to distinguish between same items or similar items that have basically same purposes or functions. It should be understood that there is no logical or time sequence dependency between "first" and "second", and a quantity and an execution sequence are not limited. It should also be understood that although terms such as "first" and "second" are used in the following description to describe various elements, these elements should not be limited by the terms. These terms are merely used to distinguish one element from another element. For example, a first SRv6 packet may be referred to as a second SRv6 packet, and similarly, a second SRv6 packet may be referred to as a first SRv6 packet without departing from the scope of the various examples. Both the first SRv6 packet and the second SRv6 packet may be SRv6 packets, and in some cases, may be separate and different SRv6 packets.

In this application, the term "at least one" means one or more.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used for implementation, all or some of the embodiments may be implemented in a form of a computer program product. The computer program product includes one or more computer program instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, comprising:
receiving, by a service function forwarder (SFF), a first segment routing over internet protocol version 6 (SRv6) packet, wherein a destination address of the first SRv6 packet comprises an endpoint penetrate segment ID (End.PT.SID), and the End.PT.SID indicates to the SFF to forward the first SRv6 packet to a service function (SF) device without stripping a segment routing header (SRH);
generating, by the SFF, a second SRv6 packet based on the End.PT.SID and the first SRv6 packet, wherein the second SRv6 packet comprises a control flag, the control flag indicates to the SF device to offset an internet protocol version 6 (IPv6) extension header that follows the control flag in the second SRv6 packet, and the IPv6 extension header in the second SRv6 packet comprises an SRH; and
sending, by the SFF, the second SRv6 packet to the SF device.

2. The method according to claim 1, wherein the control flag further indicates to the SF device to return the IPv6 extension header in a process of returning a packet to the SFF, and after sending, by the SFF, the second SRv6 packet to the SF device, the method further comprises:
receiving, by the SFF, a third SRv6 packet from the SF device, wherein the third SRv6 packet comprises the IPv6 extension header, and the third SRv6 packet and the second SRv6 packet have a same SRH; and
performing forwarding processing, by the SFF, on the third SRv6 packet based on the SRH in the third SRv6 packet.

3. The method according to claim 1, wherein the second SRv6 packet comprises a hop-by-hop option header, and the hop-by-hop option header comprises the control flag.

4. The method according to claim 3, wherein the hop-by-hop option header comprises a type-length-value (TLV), and the TLV carries the control flag.

5. The method according to claim 1, wherein:
the control flag indicates to the SF device to offset the SRH in the second SRv6 packet; or
the control flag indicates to the SF device to offset the SRH in the second SRv6 packet and another IPv6 extension header other than the SRH, wherein the another IPv6 extension header follows the control flag in the second SRv6 packet.

6. The method according to claim 1, wherein the second SRv6 packet further comprises target information, the target information is used when the SF device performs service processing, and the target information is obtained in the following manner:
obtaining, by the SFF, the target information from the SRH in the first SRv6 packet; or
obtaining, by the SFF, service information from the SRH in the first SRv6 packet, and querying mapping relationship information based on the service information to obtain the target information, wherein the mapping relationship information stores a correspondence between the service information and the target information.

7. The method according to claim 6, wherein:
the target information comprises at least one of service function chain (SFC) metadata or a virtual private network ID (VPN ID); or
the service information comprises at least one of the SFC metadata or the VPN ID.

8. The method according to claim 6, wherein the target information and control information are located in a same type-length-value (TLV) in the second SRv6 packet.

9. A service function forwarder (SFF), comprising:
a receiver, configured to receive a first segment routing over internet protocol version 6 (SRv6) packet, wherein a destination address of the first SRv6 packet comprises an endpoint penetrate segment ID (End.PT.SID), and the End.PT.SID indicates to the SFF to forward the first SRv6 packet to a service function (SF) device without stripping a segment routing header (SRH);
at least one processor; and
a non-transitory computer readable storage medium storing a program that is executable by the at least one processor, the program including instructions to:
generate a second SRv6 packet based on the End.PT.SID and the first SRv6 packet, wherein the second SRv6 packet comprises a control flag, the control flag indicates to the SF device to offset an internet protocol version 6 (IPv6) extension header that follows the control flag in the second SRv6 packet, and the IPv6 extension header in the second SRv6 packet comprises an SRH; and a transmitter, configured to send the second SRv6 packet to the SF device.

10. The SFF according to claim 9, wherein the control flag further indicates to the SF device to return the IPv6 extension header in a process of returning a packet to the SFF, and the program further includes instructions to:

after sending, by the SFF, the second SRv6 packet to the SF device, receive a third SRv6 packet from the SF device, wherein the third SRv6 packet comprises the IPv6 extension header, and the third SRv6 packet and the second SRv6 packet have a same SRH; and perform forwarding processing on the third SRv6 packet based on the SRH in the third SRv6 packet.

11. The SFF according to claim 9, wherein the second SRv6 packet comprises a hop-by-hop option header, and the hop-by-hop option header comprises the control flag.

12. The SFF according to claim 11, wherein the hop-by-hop option header comprises a type-length-value (TLV), and the TLV carries the control flag.

13. The SFF according to claim 9, wherein:

the control flag indicates to the SF device to offset the SRH in the second SRv6 packet; or the control flag indicates to the SF device to offset the SRH in the second SRv6 packet and another IPv6 extension header other than the SRH, wherein the another IPv6 extension header follows the control flag in the second SRv6 packet.

14. The SFF according to claim 9, wherein the second SRv6 packet further comprises target information, the target information is used when the SF device performs service processing, and the program further includes instructions to:

obtain the target information from the SRH in the first SRv6 packet; or obtain service information from the SRH in the first SRv6 packet, and query mapping relationship information based on the service information to obtain the target information, wherein the mapping relationship information stores a correspondence between the service information and the target information.

15. The SFF according to claim 14, wherein:

the target information comprises at least one of service function chain (SFC) metadata or a virtual private network ID (VPN ID); or the service information comprises at least one of the SFC metadata or the VPN ID.

16. The SFF according to claim 14, wherein the target information and control information are located in a same type-length-value (TLV) in the second SRv6 packet.

17. A system, comprising:

a service function forwarder (SFF); and a service function (SF) device;

wherein the SFF is configured to:

receive a first segment routing over internet protocol version 6 (SRv6) packet, wherein a destination address of the first SRv6 packet comprises an endpoint penetrate segment ID (End.PT.SID), and the End.PT.SID indicates to the SFF to forward the first SRv6 packet to the SF device without stripping a segment routing header (SRH);

generate a second SRv6 packet based on the End.PT.SID and the first SRv6 packet, wherein the second SRv6 packet comprises a control flag, the control flag indicates to the SF device to offset an internet protocol version 6 (IPv6) extension header that follows the control flag in the second SRv6 packet, and the IPv6 extension header in the second SRv6 packet comprises an SRH; and send the second SRv6 packet to the SF device; and wherein the SF device is configured to:

receive the second SRv6 packet from the SFF; and offset the IPv6 extension header in the second SRv6 packet based on the control flag.

18. The system according to claim 17, wherein the control flag further indicates to the SF device to return the IPv6 extension header in a process of returning a packet to the SFF, and the SFF is further configured to:

after sending the second SRv6 packet to the SF device, receive a third SRv6 packet from the SF device, wherein the third SRv6 packet comprises the IPv6 extension header, and the third SRv6 packet and the second SRv6 packet have a same SRH; and perform forwarding processing on the third SRv6 packet based on the SRH in the third SRv6 packet.

19. The system according to claim 17, wherein the second SRv6 packet comprises a hop-by-hop option header, and the hop-by-hop option header comprises the control flag.

20. The system according to claim 19, wherein the hop-by-hop option header comprises a type-length-value (TLV), and the TLV carries the control flag.

* * * * *

UNITED STATES PATENT AND TRADEMARK OFFICE
CERTIFICATE OF CORRECTION

PATENT NO. : 12,309,064 B2  Page 1 of 1
APPLICATION NO. : 18/047299
DATED : May 20, 2025
INVENTOR(S) : Zhang et al.

It is certified that error appears in the above-identified patent and that said Letters Patent is hereby corrected as shown below:

In the Specification

In Column 11, Line 17, delete "(BGP-IS)" and insert -- (BGP-LS) --.

In Column 14, Line 23, delete "Locator.Function" and insert -- Locator:Function --.

In Column 19, Line 59, delete "Hoplimit" and insert -- HopLimit --.

In Column 19, Line 61, delete "Hoplimit" and insert -- HopLimit --.

In Column 19, Line 63, delete "Hoplimit is" and insert -- HopLimit is --.

In Column 19, Line 63, delete "the Hoplimit" and insert -- the HopLimit --.

In Column 40, Line 58, delete "End.FT.SID" and insert -- End.PT.SID --.

In Column 41, Line 5, delete "End.FT.SID." and insert -- End.PT.SID. --.

In Column 41, Line 7, delete "End.FT.SID" and insert -- End.PT.SID --.

In Column 42, Line 58, delete "ACL" and insert -- ACL. --.

In Column 43, Line 6, delete "ACL" and insert -- ACL. --.

In Column 43, Line 8, delete "ACL" and insert -- ACL. --.

Signed and Sealed this
Twenty-fourth Day of June, 2025

Coke Morgan Stewart
*Acting Director of the United States Patent and Trademark Office*